United States Patent
Rico Alvarino et al.

(10) Patent No.: US 11,743,128 B2
(45) Date of Patent: Aug. 29, 2023

(54) TECHNIQUES FOR SUPPORTING MULTICAST BROADCAST CHANNEL BAND WIDTHS

(71) Applicant: QUALCOMM Incorporated, San Diego, CA (US)

(72) Inventors: Alberto Rico Alvarino, San Diego, CA (US); Umesh Phuyal, San Diego, CA (US); Ayan Sengupta, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 136 days.

(21) Appl. No.: 17/166,869

(22) Filed: Feb. 3, 2021

(65) Prior Publication Data
US 2021/0258223 A1    Aug. 19, 2021

Related U.S. Application Data

(60) Provisional application No. 62/976,828, filed on Feb. 14, 2020.

(51) Int. Cl.
| | |
|---|---|
| *H04L 41/0896* | (2022.01) |
| *H04W 72/0453* | (2023.01) |
| *H04W 72/30* | (2023.01) |
| *H04L 41/0816* | (2022.01) |
| *H04L 5/00* | (2006.01) |
| *H04L 43/0876* | (2022.01) |
| *H04L 41/0806* | (2022.01) |

(52) U.S. Cl.
CPC ........ *H04L 41/0896* (2013.01); *H04L 5/0058* (2013.01); *H04L 5/0091* (2013.01); *H04L 41/0816* (2013.01); *H04L 43/0876* (2013.01); *H04W 72/0453* (2013.01); *H04W 72/30* (2023.01); *H04L 41/0806* (2013.01)

(58) Field of Classification Search
None
See application file for complete search history.

(56) References Cited

U.S. PATENT DOCUMENTS

| | | | |
|---|---|---|---|
| 2007/0260851 A1* | 11/2007 | Taha | H04W 52/0229 712/204 |
| 2012/0213130 A1* | 8/2012 | Zhang | H04L 5/0053 370/312 |
| 2013/0258935 A1 | 10/2013 | Zhang et al. | |
| 2014/0169255 A1* | 6/2014 | Zhang | H04W 72/30 370/312 |
| 2016/0205664 A1 | 7/2016 | Zhang et al. | |
| 2016/0337817 A1* | 11/2016 | Malladi | H04W 72/30 |

(Continued)

FOREIGN PATENT DOCUMENTS

| | | | | |
|---|---|---|---|---|
| WO | WO-2018090193 A1 * | 5/2018 | | H04W 16/10 |

OTHER PUBLICATIONS

International Search Report and Written Opinion—PCT/US2021/016589—ISA/EPO—dated Jun. 1, 2021.

*Primary Examiner* — Jay L Vogel
(74) *Attorney, Agent, or Firm* — Arent Fox, LLP/Qualcomm

(57) ABSTRACT

Aspects described herein relate to determining a multicast broadcast (MB) bandwidth size for receiving an MB service, the MB bandwidth being different than each bandwidth size in the set of multiple configurable bandwidth sizes for receiving unicast services.

30 Claims, 13 Drawing Sheets

(56) References Cited

U.S. PATENT DOCUMENTS

| | | | |
|---|---|---|---|
| 2017/0180952 A1* | 6/2017 | Kim | H04W 4/06 |
| 2017/0367003 A1* | 12/2017 | Zhang | H04W 40/22 |
| 2018/0192255 A1* | 7/2018 | Guo | H04W 4/06 |
| 2018/0199163 A1* | 7/2018 | Chen | H04W 72/042 |
| 2020/0059894 A1* | 2/2020 | Siomina | H04W 72/0453 |

* cited by examiner

TECHNIQUES FOR SUPPORTING MULTICAST BROADCAST CHANNEL BAND WIDTHS

CLAIM OF PRIORITY UNDER 35 U.S.C. § 119

The present Application for patent claims priority to Provisional Patent Application No. 62/976,828, entitled "TECHNIQUES FOR SUPPORTING MULTICAST BROADCAST CHANNEL BANDWIDTHS" filed Feb. 14, 2020, which is assigned to the assignee hereof and hereby expressly incorporated by reference herein for all purposes.

TECHNICAL FIELD

The present disclosure relates generally to communication systems, and more particularly, to providing multicast broadcast services.

DESCRIPTION OF THE RELATED TECHNOLOGY

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (such as with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard.

Some wireless communication technologies support the transmission of broadcast services to various devices. In some regions, however, it is possible that the channelization of broadcast frequency band(s) for a broadcast service may not be compatible with bandwidths defined in the wireless communication technology that is desired for transmitting the broadcast service.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. In an aspect, the method includes receiving, by a user equipment (UE), a configuration for a first set of multiple configurable bandwidth sizes for receiving unicast services, determining a multicast broadcast (MB) bandwidth size for receiving an MB service, the MB bandwidth size being different than each bandwidth size in the set of multiple configurable bandwidth sizes for receiving unicast services, and receiving the MB service over an MB bandwidth of the MB bandwidth size.

In another aspect, a method includes transmitting, in a cell, a configuration for a first set of multiple configurable bandwidth sizes for receiving unicast services, determining a MB bandwidth size for transmitting an MB service, the MB bandwidth size being different than each bandwidth size in the set of multiple configurable bandwidth sizes for receiving unicast services, transmitting an indication of the MB bandwidth size, and transmitting, in the cell, the MB service over the MB bandwidth size.

In a further aspect, an apparatus for wireless communication is provided that includes a transceiver, a memory configured to store instructions, and one or more processors communicatively coupled with the memory and the transceiver. The one or more processors are configured to receive a configuration for a first set of multiple configurable bandwidth sizes for receiving unicast services, determine a MB bandwidth size for receiving an MB service, the MB bandwidth size being different than each bandwidth size in the set of multiple configurable bandwidth sizes for receiving unicast services, and receive the MB service over the MB bandwidth size.

In another aspect, an apparatus for wireless communication is provided that includes a transceiver, a memory configured to store instructions, and one or more processors communicatively coupled with the memory and the transceiver. The one or more processors are configured to transmit, in a cell, a configuration for a first set of multiple configurable bandwidth sizes for receiving unicast services, determine a MB bandwidth size for transmitting an MB service, the MB bandwidth size being different than each bandwidth size in the set of multiple configurable bandwidth sizes for receiving unicast services, transmit an indication of the MB bandwidth size, and transmit, in the cell, the MB service over the MB bandwidth size.

In another aspect, an apparatus for wireless communication is provided that includes means for receiving a configuration for a first set of multiple configurable bandwidth sizes for receiving unicast services, means for determining a MB bandwidth size for receiving an MB service, the MB bandwidth size being different than each bandwidth size in the set of multiple configurable bandwidth sizes for receiving unicast services; and means for receiving the MB service over the MB bandwidth size.

In a further aspect, an apparatus for wireless communication is provided that includes means for transmitting, in a cell, a configuration for a first set of multiple configurable bandwidth sizes for receiving unicast services, means for determining a MB bandwidth size for transmitting an MB service, the MB bandwidth size being different than each bandwidth size in the set of multiple configurable bandwidth sizes for receiving unicast services, means for transmitting an indication of the MB bandwidth size, and means for transmitting, in the cell, the MB service over the MB bandwidth size.

To the accomplishment of the foregoing and related ends, the one or more aspects comprise the features hereinafter fully described and particularly pointed out in the claims. The following description and the annexed drawings set forth in detail some illustrative features of the one or more aspects. These features are indicative, however, of but a few of the various ways in which the principles of various aspects may be employed, and this description is intended to include all such aspects and their equivalents.

DETAILED DESCRIPTION

Figure 1:
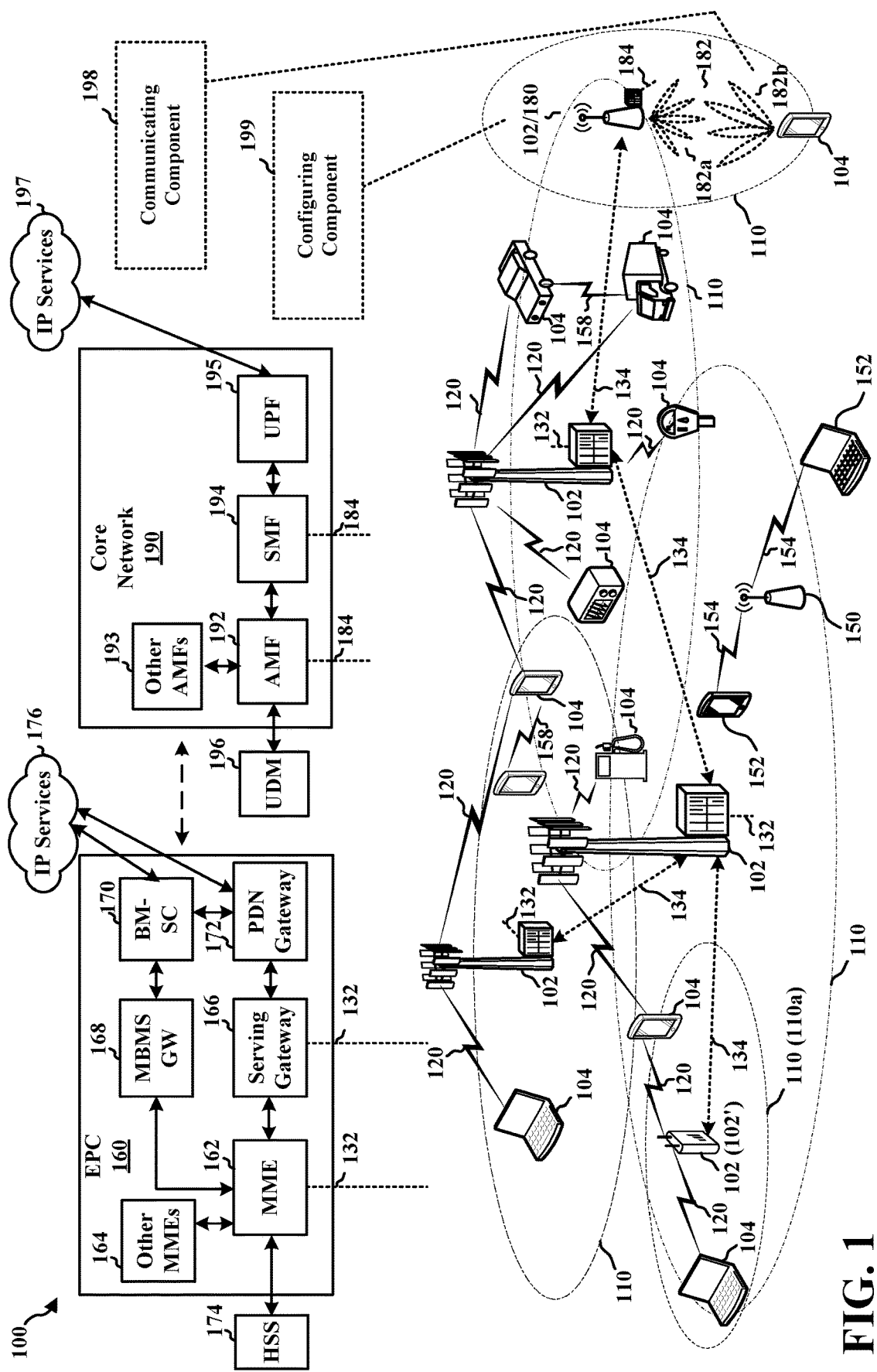
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those of ordinary skill in the art that these concepts may be practiced without these specific details. In some instances, structures and components are shown in block diagram form in order to avoid obscuring such concepts.

Various implementations relate generally to providing multicast broadcast services. Some implementations more specifically relate to providing a multicast broadcast (MB) service using one or more system bandwidths defined for a desired radio access technology over which the MB service is provided. Bandwidth sizes of the system bandwidths supported by the desired radio access technology, however, may not include or match the bandwidth sizes defined by the specific channelization for the MB services. For example, the permitted bandwidth sizes for channels of the MB service may include 6, 7, or 8 megahertz (MHz), whereas the system bandwidth sizes defined for channels of the desired radio access technology (for example, fifth generation (5G) new radio (NR), long term evolution (LTE)) may include 1.4, 3, 5, 10, 15, and 20 MHz, among other examples, but not 6, 7 or 8 MHz (or otherwise not include the bandwidth size defined for the MB service). Aspects described herein relate to supporting MB services over a radio access technology in such scenarios in which the bandwidth size defined for the MB service does not match the supported bandwidth sizes of the radio access technology.

In some aspects, new system bandwidths, or bandwidth sizes, can be defined and supported in the radio access technology for providing MB services. In some implementations, a node (for example, a base station) can indicate the new bandwidth sizes for the MB services in a master information block (MIB), for example, by using otherwise unused values of an existing field or information element (IE), or by defining or using a new or different field or IE to indicate the new bandwidth sizes, among other examples. In some implementations, nodes communicating in the wireless network can initially select, indicate, or otherwise utilize, for the radio access technology, a bandwidth size supported by the radio access technology that is larger or smaller than the bandwidth size defined for the MB service. In some such implementations, a node (for example, a base station) can subsequently signal the bandwidth size for the MB service (the "MB bandwidth" or "MB bandwidth size") to UEs desiring to receive the MB service. For example, the MB bandwidth size can be signaled for a multicast-broadcast single-frequency network (MBSFN) area in a system information block (SIB) or in a broadcast channel information list, among other examples. A node (for example, a UE) receiving the signaling can subsequently utilize the MB bandwidth size for obtaining the MB service. In some implementations, the nodes can combine multiple component carriers (CCs) of the radio access technology to achieve the MB bandwidth size. For example, the CCs may have individual associated bandwidth sizes that are each smaller than the MB bandwidth size but, when the CCs are combined together, they may collectively achieve (or constitute) a resulting aggregate bandwidth size that at least matches (or exceeds) the MB bandwidth size for communicating the MB service.

Several aspects of telecommunication systems will now be presented with reference to various apparatus and methods. These apparatus and methods will be described in the following detailed description and illustrated in the accompanying drawings by various blocks, components, circuits, processes, algorithms, among other examples (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, among other examples, whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (for example, a 5G Core (5GC)). The base stations 102 may include macrocells (high power cellular base station) or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (for example, an S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (for example, handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (for example, through the EPC 160 or core network 190) with each other over third backhaul links 134 (for example, X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102a may have a coverage area 110a that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 or downlink (DL) (also referred to as forward link) transmissions from a base station 102 to a UE 104. The communication links 120 may use multiple-input and multiple-output (MIMO) antenna technology, including spatial multiplexing, beamforming, or transmit diversity. The communication links may be through one or more carriers. The base stations 102/UEs 104 may use spectrum up to Y MHz (for example, 5, 10, 15, 20, 100, 400 MHz, among other examples) bandwidth size per carrier allocated in a carrier aggregation of up to a total of Yx MHz (x component carriers) used for transmission in each direction. The carriers may or may not be adjacent to each other. Allocation of carriers may be asymmetric with respect to DL and UL (for example, more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Some UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102a may operate in a licensed or an unlicensed frequency spectrum. When operating in an unlicensed frequency spectrum, the small cell 102a may employ NR and use the same 5 GHz unlicensed frequency spectrum as used by the Wi-Fi AP 150. The small cell 102a, employing NR in an unlicensed frequency spectrum, may boost coverage to or increase capacity of the access network.

A base station 102, whether a small cell 102a or a large cell (for example, macro base station), may include or be referred to as an eNB, gNodeB (gNB), or another type of base station. Some base stations, such as gNB 180 may operate in a traditional sub 6 GHz spectrum, in millimeter wave (mmW) frequencies, or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (for example, 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, or antenna arrays to facilitate the beamforming.

The base station 180 may transmit a beamformed signal to the UE 104 in one or more transmit directions 182a. The UE 104 may receive the beamformed signal from the base station 180 in one or more receive directions 182b. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, or other IP services.

The base station may include or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (for example, MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (for example, parking meter, gas pump, toaster, vehicles, heart monitor, among other examples). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in some aspects, the UE 104 may include a communicating component 198 configured to receive a multicast broadcast (MB) service from a base station 102, determine a MB bandwidth size for receiving communications related to the MB service, which may be determined based on a configuration of multiple bandwidth sizes defined for a radio access technology (for example, NR, LTE, etc.), one or more related parameters, or otherwise, or other functionalities described herein. In some aspects, the base station 180 may include a configuring component 199 configured to transmit the MB service to one or more UEs 104, indicate the configuration of multiple bandwidth sizes defined for the radio access technology or for indicating the one or more parameters for determining the MB bandwidth size, or other functionalities described herein. Although the following description may be described in terms of 5G NR and related features, the concepts described herein may be applicable to other areas or wireless communication technologies, such as LTE, LTE-A, CDMA, GSM, etc.

Figure 2:
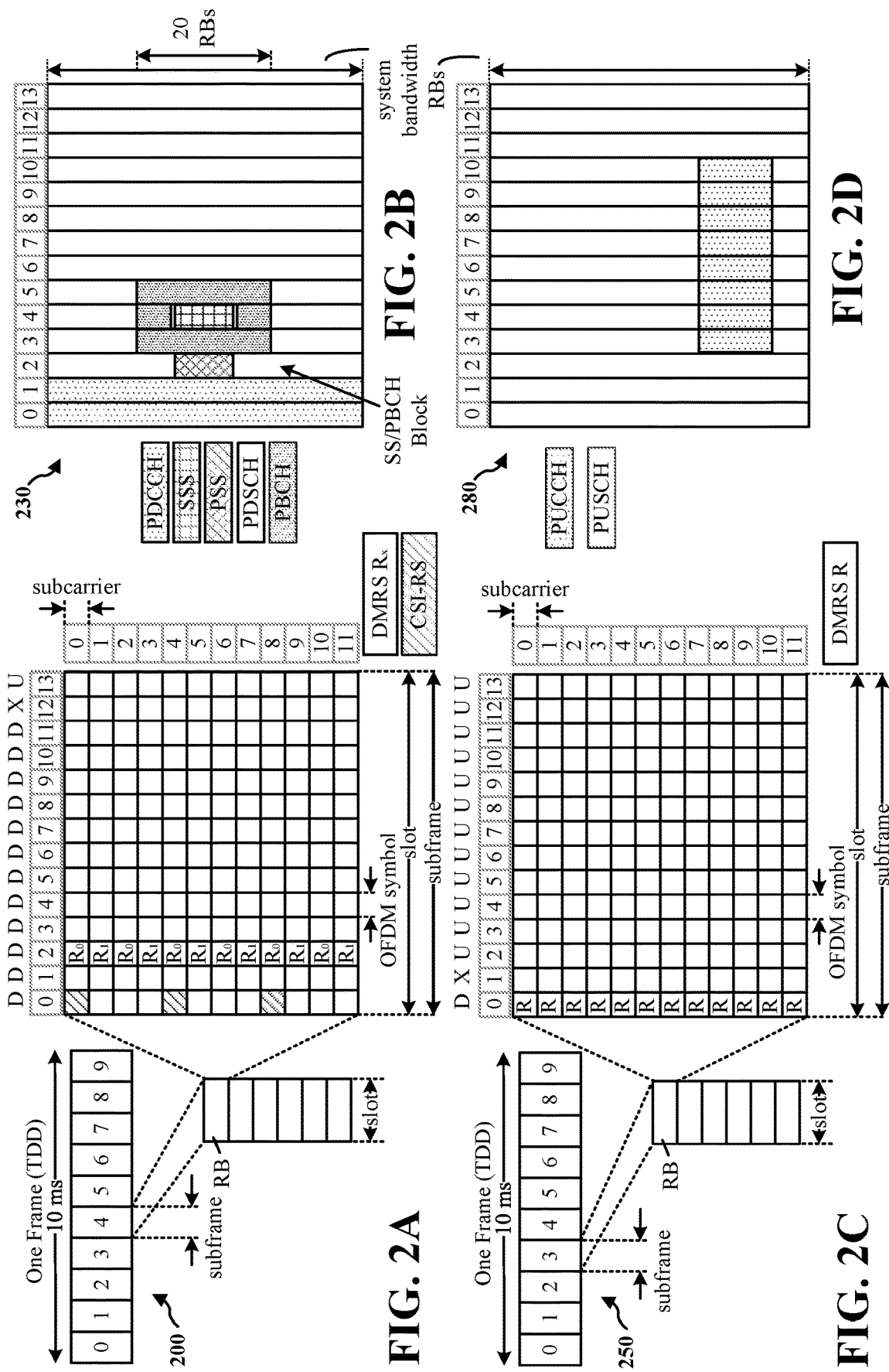
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description presented herein applies also to a 5G/NR frame structure that is TDD.

Other wireless communication technologies may have a different frame structure or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), or UCI.

Figure 3:
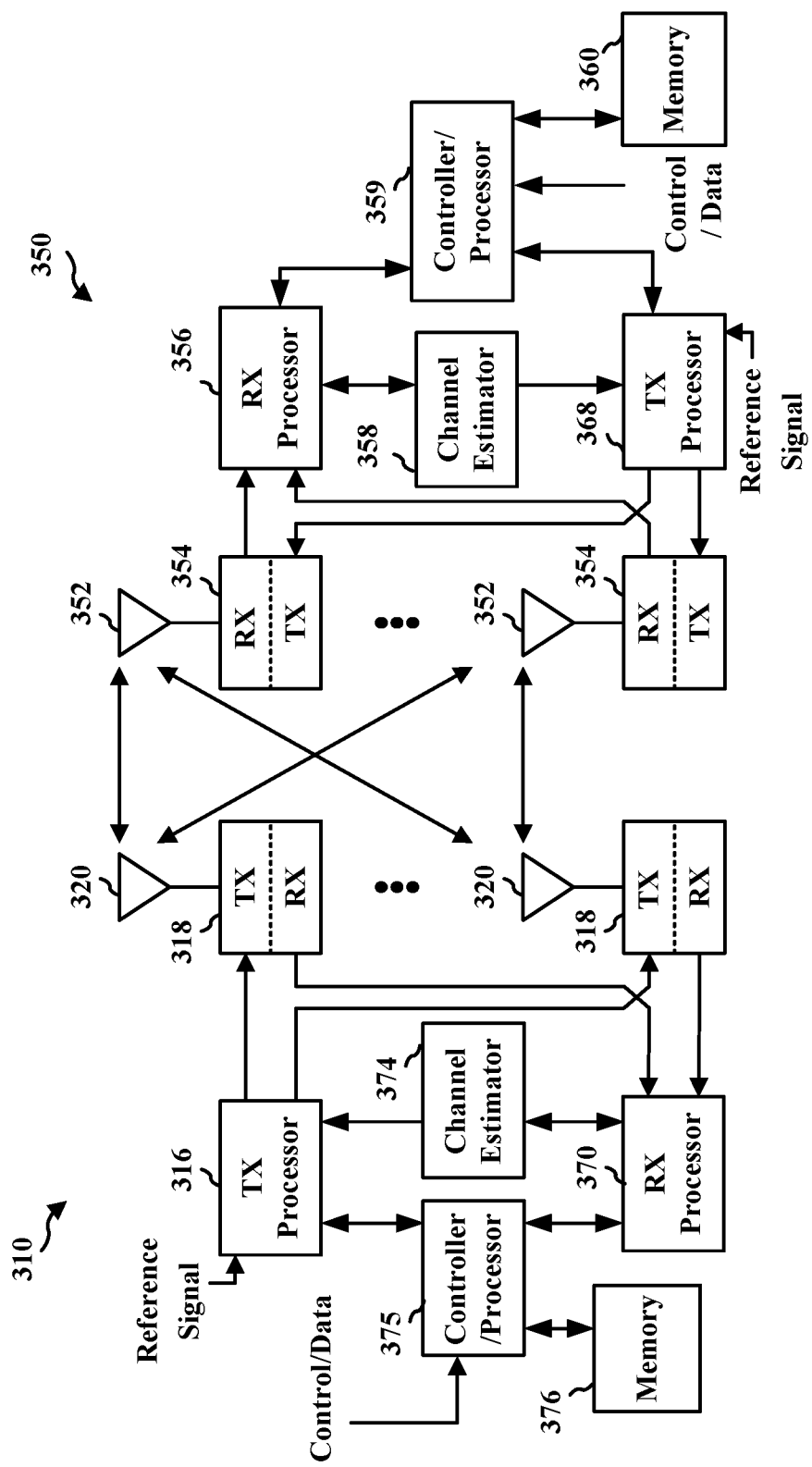
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (such as MIB, SIBs), RRC connection control (such as RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (such as binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (such as a pilot) in the time or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK or NACK protocol to support HARQ operations.

Similar to the functionality described in connection with the DL transmission by the base station 310, the controller/processor 359 provides RRC layer functionality associated with system information (for example, MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK or NACK protocol to support HARQ operations.

At least one of the TX processor 368, the RX processor 356, and the controller/processor 359 may be configured to perform aspects in connection with communicating component 198 of FIG. 1.

At least one of the TX processor 316, the RX processor 370, and the controller/processor 375 may be configured to perform aspects in connection with configuring component 199 of FIG. 1.

Some wireless communication technologies, such as LTE, support dedicated broadcast carriers. For example, in LTE, a carrier can be downlink-only, multimedia broadcast multicast service (MBMS)-only (for example, no unicast support). This can be similar in spirit to MB standards like DVB-T, ATSC. Content can typically be free-to-air, where receivers may not need to be registered with the network or have credentials (such as subscriber identity module (SIM) credentials) to receive the service (for example, TV service, car or automobile related broadcast information). In many countries around the world, the channelization of broadcast frequency bands for MB services is in units of bandwidth sizes that are not compatible with LTE bandwidths. For example, LTE supports system bandwidth sizes of 1.4, 3, 5, 10, 15, 20 megahertz (MHz), which correspond to 6, 15, 25, 50, 75 and 100 physical resource blocks (PRBs). In Europe, for example, channelization for MB service channels may be in chunks of bandwidth of 8, 7, 6 MHz. For deploying in some regions and some frequency bands, aspects described herein relate to supporting these MB bandwidth sizes in the radio access technology (for example, NR, LTE).

Figure 4:
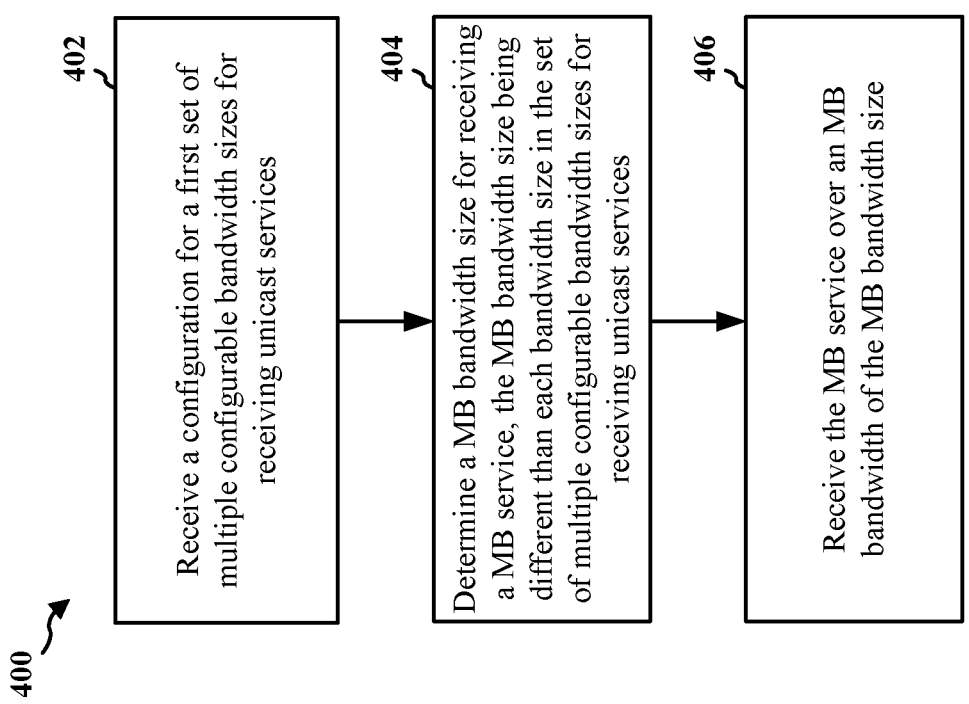
FIG. 4 is a flowchart of an example of a method 400 for determining a MB bandwidth size for receiving communications related to an MB service in accordance with some aspects of the present disclosure.

FIG. 4 is a flowchart of an example of a method 400 for determining a MB bandwidth size for receiving communications related to an MB service in accordance with some aspects of the present disclosure. The method 400 may be performed by a UE (such as the UE 104, the apparatus 1002, the processing system 1114, which may include the memory 360 and which may be the entire UE 104 or a component of the UE 104, such as the TX processor 368, the RX processor 356, or the controller/processor 359).

In method 400, at Block 402, a device (for example, a UE 104) can receive a configuration for a first set of multiple configurable bandwidth sizes for receiving unicast services. In an aspect, communicating component 198, for example, in conjunction with one or more of the TX processor 368, the RX processor 356, or the controller/processor 359, the memory 360, the receiver 354RX, can receive (for example, from a base station 102) a configuration for the first set of multiple configurable bandwidth sizes for receiving unicast services. For example, a radio access technology (such as NR, LTE, other cellular communication technologies) can define the multiple configurable bandwidth sizes for receiving unicast services or other services that may not specifically include a MB service, and in one example, the multiple configurable bandwidth sizes can correspond to the radio access technology (e.g., for unicast or other services defined by the radio access technology). For example, the configurable bandwidth sizes can include multiple bandwidth sizes that can be used in configuring a system bandwidth for a CC of the radio access technology, in terms of a number of resource blocks that can be associated with a frequency range.

For example, communicating component 198 can receive the configuration in a MIB for a CC, where the MIB has a downlink bandwidth IE indicating the downlink bandwidth or bandwidth size for the CC. In an example, the IE can be defined to indicate one of a set of configurable bandwidth sizes defined for the radio access technology, such as 6 PRBs, 15 PRBs, 25 PRBs, 50 PRBs, 75 PRBs, and 100 PRBs (corresponding 1.4 MHz, 3 MHz, 5 MHz, 10 MHz, 15 MHz, and 20 MHz, respectively) in NR/LTE. In a specific example, a base station can specify or fix the system bandwidth in MIB for both MBMS-dedicated and normal carriers in NR/LTE. The MIB format for each can be separate, but both may include an IE indicating downlink bandwidth for the CC, as shown in the examples below. An example of a MIB for a MBMS-dedicated carrier may have a format similar to the following:

```
MasterInformationBlock-MBMS-r14 ::= SEQUENCE {
    dl-Bandwidth-MBMS-r14           ENUMERATED {n6, n15, n25, n50, n75, n100},
    systemFrameNumber-r14           BIT STRING (SIZE(6)),
    additionalNonMBSFNSubframes-r14 INTEGER (0..3),
    spare                           BIT STRING (SIZE(13))
}
```

An example of a MIB for a normal carrier may have a format similar to the following:

```
MasterInformationBlock ::= SEQUENCE {
    dl-Bandwidth                ENUMERATED {n6, n15, n25, n50, n75, n100},
    phich-Config                PHICH-Config,
    systemFrameNumber           BIT STRING (SIZE(8)),
    schedulingInfoSIB1-BR-r13   SIB1-BR-r13,
    systemInfoUnchanged-BR-r15  BOOLEAN,
    spare                       BIT STRING (SIZE(4))
}
```

In an example, MBMS-dedicated and normal (or mixed) carriers may use different scrambling for a primary broadcast channel (PBCH), so the UE can try both hypotheses when decoding (and then correspondingly interpret the MIB). In this regard, in an example, the UE 104 can determine the downlink bandwidth for the CC as one of the configurable bandwidth sizes in the configuration.

In method 400, at Block 404, the device (for example, UE 104) can determine a MB bandwidth size for receiving a MB service, where the MB bandwidth size is different than each bandwidth size in the set of multiple configurable bandwidth sizes for receiving unicast services. In an aspect, communicating component 198, for example, in conjunction with one or more of the TX processor 368, the RX processor 356, or the controller/processor 359, the memory 360, can determine the MB bandwidth size for receiving the MB service, the MB bandwidth size being outside of the set (e.g., being different than each bandwidth size in the set) of multiple configurable bandwidth sizes for receiving unicast services. For example, the MB bandwidth size can correspond to a channelization of a broadcast frequency band for the MB service, as described, which may be defined as a bandwidth size of 8, 7, or 6 MHz in some examples, or otherwise defined as a bandwidth size that is outside of the set of bandwidth sizes defined as configurable bandwidth sizes for the radio access technology (for example, not in the set of 1.4, 3, 5, 10, 15, 20 MHz for NR/LTE). Various implementations, which can be provided in conjunction with one another or alternatively to one another, are described herein for determining the MB bandwidth size for providing the MB service using the radio access technology based on or otherwise in view of one or more of the multiple configurable bandwidth sizes of the radio access technology.

In one example, the MIB that indicates the downlink bandwidth for a CC can be adapted to indicate MB bandwidth sizes as well, and communicating component 198 can determine the MB bandwidth size based on the MIB in this regard. In a specific example, the MIB as defined may have two spare values possible for indicating in the enumeration for the downlink bandwidth IE (for example, beyond indicating 6 PRBs, 15 PRBs, 25 PRBs, 50 PRBs, 75 PRBs, and 100 PRBs). In an example, a base station 102 (or other network component, the base station 102 or other network component being more generally referred to herein as the "network") can use one or more of the spare values of the enumeration to indicate one or more MB bandwidth sizes, which can be for a given CC in one example. In one specific example, if the number of new channel bandwidth sizes for MB is two or less, the dl-bandwidth-MBMS-r14 field can be used (which has two spare values) to introduce the new channel bandwidth sizes. For example, 30 and 40 PRBs can be introduced, corresponding approximately to 6 and 8 MHz, respectively. In a specific example, the MIB can have a format similar to the following:

```
MasterInformationBlock-MBMS-r14 ::= SEQUENCE {
    dl-Bandwidth-MBMS-r14       ENUMERATED {n6, n15, n25, n50, n75, n100, n30, n40},
    systemFrameNumber-r14       BIT STRING (SIZE(6)),
    additionalNonMBSFNSubframes-r14 INTEGER (0..3),
    spare                       BIT STRING (SIZE(13))
}
``` where "n30" and "n40" occupy the spare values. In this example, communicating component 198 can receive the MIB, and where the downlink bandwidth IE indicates one of the spare values for the downlink bandwidth, the communicating component 198 can determine the associated MB bandwidth size for the CC (for example, as 30 or 40 PRBs, or correspondingly 6 or 8 MHz in the above example). For example, legacy UEs may not understand these values, and thus may not camp on, or try to access services of, this cell. In this regard, potential incompatibility issues can be avoided. Additionally, the set of possible bandwidth sizes for dedicated-MBMS carriers may be different from the set of possible bandwidths for normal LTE/NR carriers (e.g. the values "n30" and "n40" are only present in a MIB over a dedicated-MBMS carrier).

In another specific example, the MIB can be adapted such that the network can use one of the spare values of the enumeration to indicate an extended MIB. The extended MIB can have another IE defining a new enumeration of one or more MB bandwidth sizes. This can allow for supporting more than two possible MB bandwidth sizes where the MIB can indicate the spare value and then can indicate the MB bandwidth size in the new enumeration. In this example, communicating component 198 can determine the MB bandwidth size based on detecting the spare value in the downlink bandwidth used to signal that the MIB has the new enumeration, and then determining the MB bandwidth size based on the value of the new enumeration. For example, if the number of new channel bandwidth sizes for MB is more than two (for example, more than the number of spare values), some of the spare bits can be used to signal this information. For example, the MIB can introduce new channel bandwidth sizes with 30, 35, 40 PRBs. In this example, the dl-bandwidth IE can be set to a different value (to prevent legacy UEs from camping in this cell), and some of the spare bits can be used to signal the real value. In a specific example, the MIB can have a format similar to the following:

```
MasterInformationBlock-MBMS-r14 ::= SEQUENCE {
    dl-Bandwidth-MBMS-r14       ENUMERATED {n6, n15, n25, n50, n75, n100, other},
    systemFrameNumber-r14       BIT STRING (SIZE(6)),
    additionalNonMBSFNSubframes-r14 INTEGER (0..3),
    dl-Bandwidth-MBMS-r17       ENUMERATED {n30, n35, n40, spare1},
    spare                       BIT STRING (SIZE(11))
}
``` where the network can indicate "other" in the downlink bandwidth IE to signal the existence of dl-Bandwidth-MBMS-r17 IE, which can specify the MB bandwidth size, and accordingly communicating component 198 can determine the MB bandwidth size (as 30, 35, or 40 PRBs, in this example). In another specific example, the MIB can have a format similar to the following:

```
MasterInformationBlock-MBMS-r14 ::= SEQUENCE {
    dl-Bandwidth-MBMS-r14       ENUMERATED {n6, n15, n25, n50, n75, n100, n30, other},
    systemFrameNumber-r14       BIT STRING (SIZE(6)),
    additionalNonMBSFNSubframes-r14 INTEGER (0..3),
    dl-Bandwidth-MBMS-r17       ENUMERATED {n35, n40},
    spare                       BIT STRING (SIZE(12))
}
``` where one spare value of the downlink bandwidth IE can defined to signal one MB bandwidth size (for example, 30 PRBs) and the other spare value (for example, as "other") to signal the existence of the dl-Bandwidth-MBMS-r17 IE, from which the communicating component 198 can determine the MB bandwidth size as 35 or 40 PRBs. In any case, in this example, communicating component 198 can determine the MB bandwidth size based on the MIB value(s), as described above.

In another example, the network can use certain combinations of channel bandwidth sizes and frequencies of the radio access technology that are not yet defined for use (for example, in a standard of the radio access technology) to indicate MB bandwidth sizes. For example, in a given frequency range for the radio access technology, a downlink bandwidth size of 100 PRBs (20 MHz) may not be currently supported, and for example, the network can use this combination of 100 PRBs in the given frequency range to indicate or imply configuration of a MB bandwidth size (for example, 40 PRBs, or 8 MHz). The network and UE can know or configure the mapping of the frequency range and bandwidth combination(s) to the associated MB bandwidth size(s) such that when the communicating component 198 receives the frequency range and bandwidth combination(s) in the MIB, the communicating component 198 can instead determine the associated MB bandwidth size. For example, the interpretation of channel bandwidth can be based on the raster frequency (or E-UTRA Absolute Radio Frequency number (EARFCN)). For example, in this case, there may be no UEs in those bands today (as those frequencies are not supported now). An alternative may be to reuse the entries for some of those bands, and repurpose them for the new channel bandwidth sizes. In any case, the communicating component 198, when encountering such a frequency/bandwidth combination, can interpret or substitute the indicated downlink bandwidth as a specific MB bandwidth size known or otherwise configured to correspond to the frequency/bandwidth combination.

In another example, in determining the MB bandwidth size, the MIB can indicate one of the configurable bandwidth sizes for receiving unicast services (for example, 6 PRBs, 15

PRBs, 25 PRBs, 50 PRBs, 75 PRBs, or 100 PRBs in NR/LTE) as a system bandwidth, but the network can expand or reduce the MB bandwidth size from the configured system bandwidth. Currently, in LTE, the transmission bandwidth of PMCH matches that of system bandwidth (in other words, PMCH is fixed in the specification to use the same number of PRBs as the system bandwidth), whereas other channels (for example, PDSCH) are dynamically scheduled, and do not necessarily use the whole system bandwidth. In examples described herein, communicating component 198 can determine the system bandwidth from the MIB and can determine the MB bandwidth or MB bandwidth size to be different from the system bandwidth (for example, expanded or reduced from the system bandwidth), as described herein. For example, for a given MB bandwidth size, communicating component 198 can determine from the MIB either of: a maximum one of the configurable bandwidth sizes for receiving unicast services that is smaller than the MB bandwidth size; or a minimum one of the configurable bandwidth sizes for receiving unicast services that is larger than the MB bandwidth size. In various examples, for a CC to provide a MB service having 8 MHz MB bandwidth size, the MIB can possibly configure a 5 MHz (25 PRBs) or 10 MHz (50 PRBs) downlink bandwidth, and the MB bandwidth size can accordingly be expanded or reduced therefrom.

In these examples, the communicating component 198 can receive the MIB and determine the specified downlink bandwidth. The communicating component 198 can begin decoding at least some system information (for example, SIBs) based on the specified downlink bandwidth at least until the communicating component 198 is able to determine the MB bandwidth size (for example, in a SIB, MCCH, PMCH).

For example, where the MB bandwidth size is larger than the specified downlink bandwidth, MIB can indicate a system bandwidth size of x PRBs. At some point, the network can inform the UE of the true MB bandwidth size y PRBs (where y>x in this example). For example, communicating component 198 can decode system information based on the bandwidth size of x PRBs at least for some of the system information, and then communicating component 198 can decode subsequent system information (for example, subsequent to the MB bandwidth being determined) based on the MB bandwidth size of y PRBs.

In one specific example, the network can signal bandwidth size per MBSFN area (in SIB). When configuring an MBSFN area (for example, in IE MBSFN-AreaInfo-r9 in SIB13), the UE can be configured with a bandwidth size to be used for the PMCH reception, and the communicating component 198 can receive and determine the bandwidth size for the MB service. In this example, different MBSFN areas may have different bandwidth sizes. For backwards compatibility, in an example, the network can use one MBSFN area to serve legacy devices (that do not understand the new system bandwidth), and another MBSFN area to fill the whole system bandwidth. The communicating component 198, based on receiving the indication of bandwidth size for the MBSFN area in the SIB, can decode PMCH (for example, MCCH) for the corresponding MBSFN area using the channel bandwidth size of y PRBs (in other words, the MB bandwidth size) as indicated in the SIB.

In another example, where the MB bandwidth size is larger than the specified downlink bandwidth, MIB can indicate a system bandwidth size of x PRBs and the network can signal MB bandwidth size in a broadcast channel information (for example, a PMCH-InfoList) received over a broadcast control channel (for example, MCCH). In this example, different services in the same MBSFN area can have different channel bandwidth sizes. In addition, in this example, the communicating component 198 can receive and decode PMCH based on bandwidth size of x PRBs indicated in the MIB. Then, for PMCH with no "bandwidth overriding" (for example, as indicated in the PMCH-InfoList), the communicating component 198 can decode the channel based on x PRBs channel bandwidth size. For PMCH with "bandwidth overriding" (for example, as indicated in the PMCH-InfoList), the communicating component 198 can use the channel based on y PRBs, where the bandwidth size of y PRBs (or the corresponding MHz) can be indicated in, and communicating component 198 can determine the bandwidth size of y PRBs from, the PMCH-InfoList. For the subframes where the network sends MCCH (and potentially also some of the MCH corresponding to services with larger system bandwidth), the communicating component 198 can use a channel based on x PRBs (for example, until the MB bandwidth size is indicted in, and determined by the communicating component 198 based on, the PMCH-InfoList sent via the MCCH).

For example, where the MB bandwidth size is smaller than the specified downlink bandwidth, MIB can indicate a system bandwidth size of x PRBs that is larger than the MB bandwidth size. At some point, the network can inform the UE of the true MB bandwidth size, y PRBs. In one specific example, when decoding the system information, the communicating component 198 assumes x PRBs. The base station 102 may only be transmitting y of these x PRBs (for example by filtering out the edges of the channel). The communicating component 198 can decode the PDCCH and system information even with this mismatch (for example, the channel estimation can give lower gain in the edges). By implementation, as described further herein, the base station 102 may not schedule SIB in the edges to assist in proper decoding. In one example, as described, the network can signal the MB bandwidth size of y PRBs in SIB (for example, per MBSFN area), in MCCH (for example, per PMCH in PMCH-InfoList), or other information. The communicating component 198 can accordingly receive and use this information for channel estimation, demodulation after receiving (for example, after the SIB decode or MCCH). In this regard, for example, communicating component 198 can perform initial SIB or other decoding based on x PRBs until the communicating component 198 receives the indication of MB bandwidth size of y PRBs in a SIB or MCCH. As described above, at this point, for example, communicating component 198 can decode subsequent SIBs based on the MB bandwidth size of y PRBs.

Where the MB bandwidth size is smaller than the specified downlink bandwidth, in an example, the eNB can still schedule PMCH with x PRBs and filter out the edges (by implementation), but in this case there may be loss of the outermost PRBs. Said differently, the outer PRBs or corresponding resource elements (REs) are "punctured" from the UE perspective, so the code rate may be decreased to be able to decode. For example, punctured can refer to the REs being considered to not include communications from the base station, and can be excluded from decoding. For a given bandwidth size, considering REs as punctured and not decoding the REs can reduce the achievable code rate for a give communication.

In another example, in determining the MB bandwidth size, the network or UE can combine multiple CCs having one of the configurable bandwidth sizes for receiving unicast services (for example, 6 PRBs, 15 PRBs, 25 PRBs, 50 PRBs, 75 PRBs, or 100 PRBs in NR/LTE) to achieve the total MB bandwidth size. For example, to achieve a MB bandwidth size of 8 MHz, the base station 102 can configure one CC with 5 MHz (25 PRB) and another CC with 3 MHz (15 PRBs). In this example, there may not be tying between CCs (for example, where different CCs can broadcast different MB services). In another example, the CCs can be tied to facilitate transmitting the same MB service (for example, identified by the same temporary mobile group identifier (TMGI)) across multiple CCs. For example, in determining the MB bandwidth size in this regard, the communicating component 198 can receive (e.g., from the network) an indication of tying between the CCs to receive the same MB service. In one example, the communicating component 198 can receive information about a TMGI in a first CC (CC1— for example, in the in MCCH transmitted over CC1), which can also include a pointer to a second CC (CC2—for example, the pointer can be a point to or of a EARFCN). In this example, communicating component 198 can receive signaling over both CCs, and an upper layer (e.g., radio link control (RLC) layer, packet data convergence protocol (PDCP) layer, application layer, or other layers) can merge the corresponding communications to receive the MB service. In another example, the communicating component 198 can receive the MBSFN area information (for example, in SIB13, as described above), and can detect a pointer to a different CC to determine that the two CCs may share services.

In method 400, at Block 406, the device (for example, UE 104) can receive the MB service over an MB bandwidth of the MB bandwidth size. In an aspect, communicating component 198, for example, in conjunction with one or more of the TX processor 368, the RX processor 356, or the controller/processor 359, the memory 360, the receiver 354RX, can receive the MB service over the MB bandwidth of the MB bandwidth size. For example, the MB bandwidth size can be the MB bandwidth size determined as described in the examples above in reference to Block 404, and as further described in reference to FIGS. 6-9 herein. In this regard, for example, communicating component 198 can receive the MB service over a CC defined to have a MB bandwidth size determined based on a specified downlink bandwidth, where the downlink bandwidth may, in some examples, be a bandwidth size defined for unicast services. In another example, communicating component 198 can receive the MB service over multiple CCs defined to have respective bandwidth sizes defined for unicast services that can be combined to achieve a MB bandwidth size. In an example, in receiving the MB service, communicating component 198 can receive communications over a MCCH, MTCH in the MB bandwidth.

As described in further examples herein, the communicating component 198 (for example, via TX processor 368, the RX processor 356, or the controller/processor 359, the memory 360, the transmitter 354TX) can also report a MBMS interest indication, which may indicate a corresponding MB bandwidth size, to the base station 102. A given base station, however, may not understand the new MB bandwidth size (for example, as differing from the configurable bandwidth sizes defined for unicast services). In an example, the communicating component 198 can instead report the MBMS interest indication to the base station 102 indicating a next highest bandwidth size defined for unicast services. Said differently, communicating component 198 can determine a minimum bandwidth size of the configurable bandwidth sizes for unicast communications that is larger than the desired MB bandwidth size, and can include an indication of that bandwidth size in the MBMS interest indication or other report to the base station 102. In this or another example, the communicating component 198 can also report the MB bandwidth size in a new field of the MBMS interest indication or another report. The base station 102 may determine the MB bandwidth size or the one of the configurable bandwidth sizes for unicast services to utilize based on the indication received from the UE 104.

Figure 5:
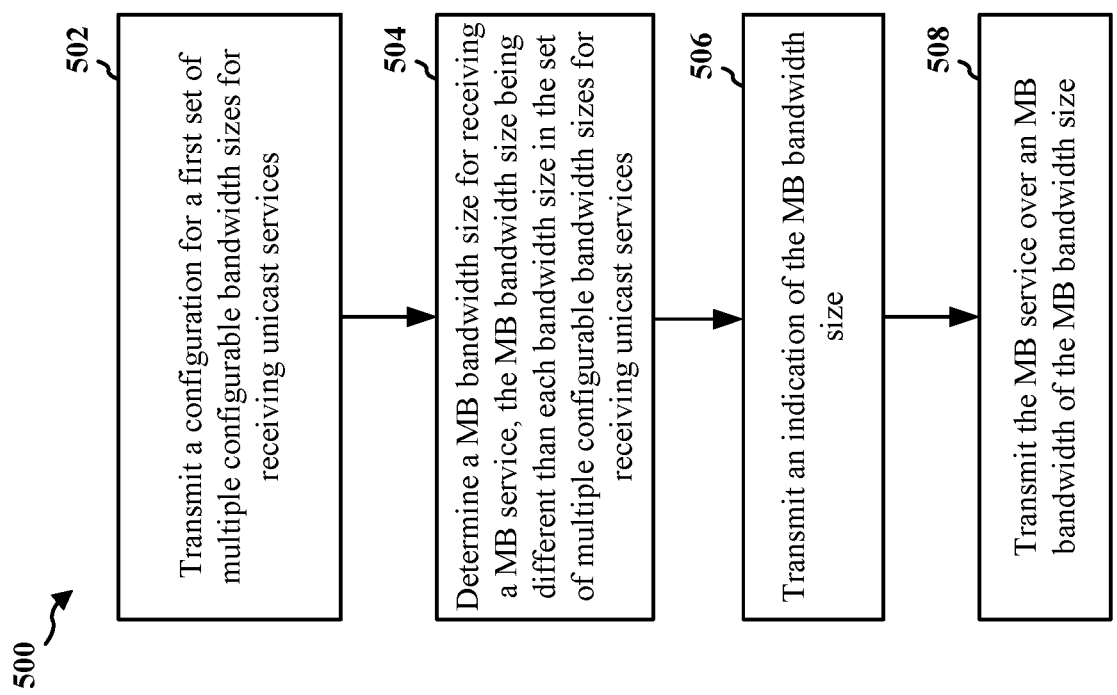
FIG. 5 is a flowchart of an example of a method 500 for configuring a MB bandwidth size for receiving communications related to an MB service in accordance with some aspects of the present disclosure.

FIG. 5 is a flowchart of an example of a method 500 for configuring a MB bandwidth size for receiving communications related to an MB service in accordance with some aspects of the present disclosure. The method 500 may be performed by a base station (such as the base station 102, the apparatus 1202, the processing system 1314, which may include the memory 376 and which may be the entire base station 102 or a component of the base station 102, such as the TX processor 316, the RX processor 370, or the controller/processor 375).

In method 500, at Block 502, the base station can transmit a configuration for a first set of multiple configurable bandwidth sizes for receiving unicast services. In an aspect, configuring component 199, for example, in conjunction with one or more of the TX processor 316, the RX processor 370, or the controller/processor 375, the memory 376, the transmitter 318TX, can transmit the configuration for the first set of multiple configurable bandwidth sizes for receiving unicast services. For example, the configuring component 199 can transmit the configuration including a MIB that indicates one of the configurable bandwidth sizes.

In method 500, at Block 504, the base station can determine a MB bandwidth size for receiving a MB service where the MB bandwidth size is different than each bandwidth size in the set of multiple configurable bandwidth sizes for receiving unicast services. In an aspect, configuring component 199, for example, in conjunction with one or more of the TX processor 316, the RX processor 370, or the controller/processor 375, the memory 376, can determine the MB bandwidth size for receiving (by a UE) the MB service, the MB bandwidth size being outside of (e.g., being different than each bandwidth size in) the set of multiple configurable bandwidth sizes for receiving unicast services. For example, the configuring component 199 can determine the MB bandwidth size as related to the MB service, which may be 8, 7, or 6 MHz, and outside of the configurable bandwidth sizes supported by a radio access technology, such as 1.4, 3, 5, 10, 15, and 20 MHz in LTE/NR.

In method 500, at Block 506, the base station can transmit an indication of the MB bandwidth size. In an aspect, configuring component 199, for example, in conjunction with one or more of the TX processor 316, the RX processor 370, or the controller/processor 375, the memory 376, the transmitter 318TX, can transmit the indication of the MB bandwidth size. In some implementations, as described, configuring component 199 can transmit the indication of the MB bandwidth size in the MIB by using one or more spare values of the downlink bandwidth IE to indicate the MB bandwidth size or the existence of a new MB bandwidth size enumeration (in which case the new MB bandwidth size enumeration can indicate the MB bandwidth size).

In other implementations, as described, configuring component 199 can first transmit an indication of a system bandwidth selected from the configurable bandwidth sizes supported by the radio access technology (for unicast communications), and then can transmit a separate indication of the MB bandwidth size. For example, configuring component 199 can transmit the indication of the a system bandwidth selected from the configurable bandwidth sizes in the MIB, and then can transmit an indication of the MB bandwidth size in a SIB, PMCH, where the MB bandwidth size can be larger or smaller than the size of the system bandwidth in various examples. For example, where the MB bandwidth size is larger, configuring component 199 can transmit the indication of the MB bandwidth size when configuring a MBSFN area (for example, in SIB13), such that different MBSFN areas can have different bandwidth sizes (for example, MB bandwidth sizes or unicast bandwidth sizes for legacy devices). In this example, configuring component 199 can transmit SIBs before and including the SIB that configures the MB bandwidth size based on the system bandwidth specified in the MIB, and can transmit subsequent SIBs or PMCH based on the MB bandwidth size.

In another example, configuring component 199 can transmit the indication of the MB bandwidth size in MCCH control data (for example, in the PMCH-InfoList), which can allow different channel bandwidths or bandwidth sizes for different services in the same MBSFN area. In this example, configuring component 199 can transmit PMCH, indicated having "no bandwidth overriding" in the PMCH-InfoList, based on the system bandwidth indicated in the MIB, and can transmit PMCH, indicated having "bandwidth overriding" in the PMCH-InfoList, based on the MB bandwidth size indicated in the PMCH-InfoList or other control data.

Where the MB bandwidth size is smaller than the system bandwidth configured in the MIB, for example, configuring component 199 can transmit SIB or PMCH only over the MB bandwidth within the system bandwidth (for example, by filtering out the edges of the channel), and the UE can decode the SIB or PMCH, as described above. Additionally, for example, the configuring component 199 may not schedule SIB in the edges of the channel that do not include the MB bandwidth. For example, the MB bandwidth may be centered around a center of the system bandwidth resulting in similar edges over the system bandwidth that can be not scheduled (for SIB) or filtered out (for PMCH). In addition, in this example, configuring component 199 may similarly indicate the MB bandwidth size in a SIB (for example, SIB13 when configuring MBSFN area), in PMCH, as described above, and can accordingly transmit SIBs before and including the SIB that indicates MB bandwidth size using the system bandwidth and subsequent SIBs using the MB bandwidth.

In another example, configuring component 199 can configure multiple CCs having a system bandwidth selected from the configurable bandwidth sizes in the MIB, and can combine the multiple CCs to achieve the MB bandwidth size. In one example, configuring component 199 can indicate a relationship or tying between the CCs for receiving the MB service (for example, a relationship to the same TMGI). In one example, configuring component 199 can transmit a TMGI in a configuration for a first CC (CC1—for example, in MCCH), and can include a pointer to a second CC (CC2—for example, a pointer to a corresponding EARFCN). In another example, configuring component 199 can configure CC1 in the MBSFN area (for example, in SIB13) and can indicate a pointer to a different CC (CC2) to inform that the two CCs can be used for a given MB service.

In method 500, at Block 508, the base station can transmit the MB service over an MB bandwidth of the MB bandwidth size. In an aspect, configuring component 199, for example, in conjunction with one or more of the TX processor 316, the RX processor 370, or the controller/processor 375, the memory 376, the transmitter 318TX, can transmit the MB service over the MB bandwidth of the MB bandwidth size.

For example, configuring component 199 can transmit the MB service over the MB bandwidth as indicated in the transmitted indication described in reference to Block 506. In another example, configuring component 199 can transmit the MB service over multiple CCs as indicated in the transmitted indication and each configured based on a system bandwidth that is less than the MB bandwidth size, as described in reference to Block 506, that are combined to achieve the MB bandwidth size.

As described in further examples herein, the UE 104 can also report a MBMS interest indication or other report, which may indicate a corresponding MB bandwidth size or a unicast bandwidth size selected based on the MB bandwidth size, to the base station 102, which can be received by the configuring component 199 (for example, via TX processor 316, the RX processor 370, or the controller/processor 375, the memory 376, the receiver 318RX). Where the report includes the unicast bandwidth size (for example, a minimum configurable bandwidth size defined for unicast service that is higher than the MB bandwidth), configuring component 199 can be conservative in scheduling MB service communications (for example, based on assuming that the UE 104 has less resources available than it actually has). Where the report includes the MB bandwidth size, configuring component 199 can configure the MB service over an MB bandwidth that is of the MB bandwidth size as described herein.

Figure 6:
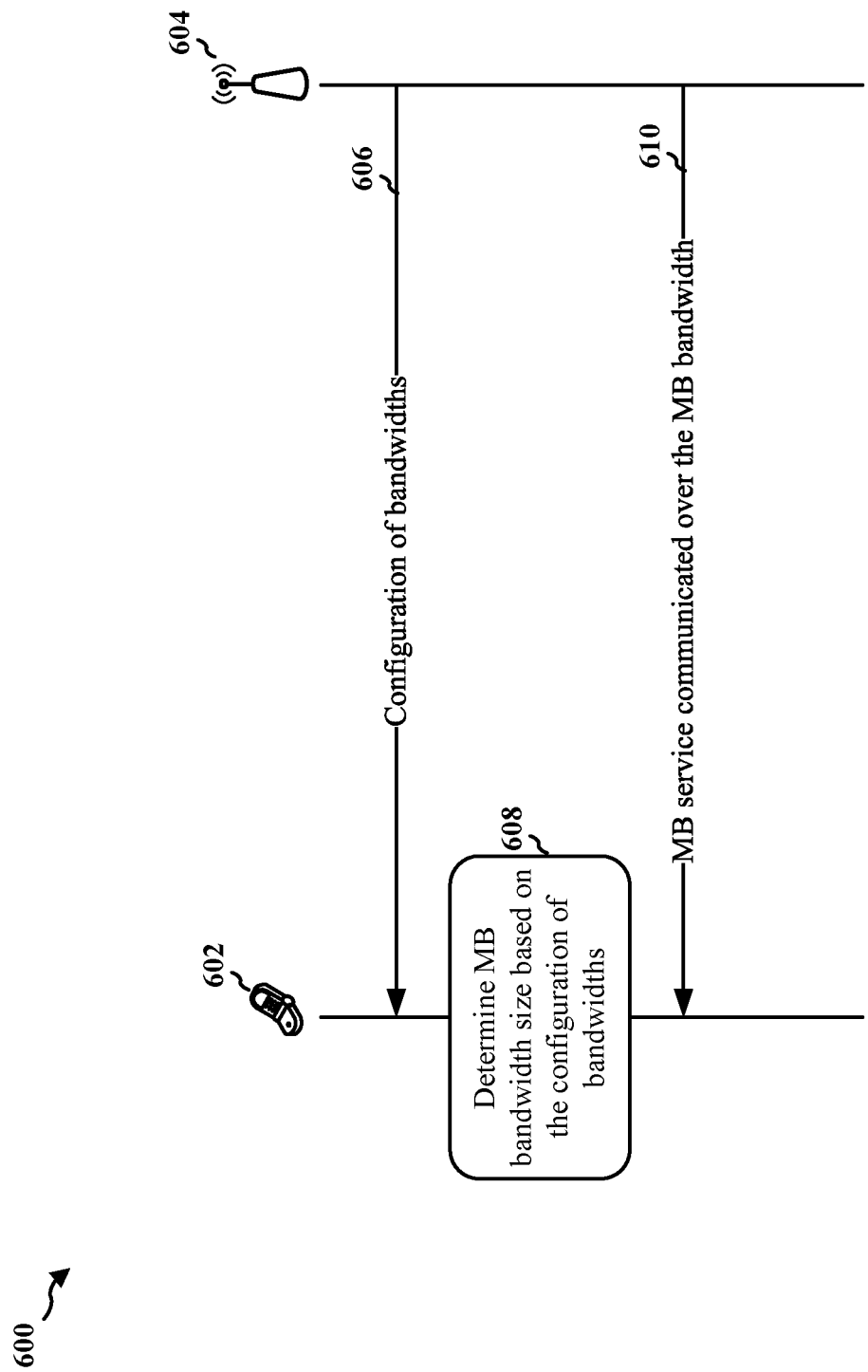
FIG. 6 illustrates an example of a system 600 for determining an MB bandwidth size for receiving a MB service in accordance with some aspects of the present disclosure.

FIG. 6 illustrates an example of a system 600 for determining an MB bandwidth size for receiving a MB service in accordance with some aspects of the present disclosure. System 600 includes a UE 602 and a base station 604 that can communicate to configure a MB service, as described herein. For example, the base station 604 can transmit a configuration of bandwidths to the UE 602 at 606. As described, the configuration of bandwidths 606 can include at least one of a configuration of configurable bandwidth sizes for unicast services or otherwise defined by a radio access technology (for example, NR or LTE) or an indication of a MB bandwidth size (for example, indicated in spare values of a downlink bandwidth indicated in the MIB). The UE 602 can determine a MB bandwidth size based on the configuration of bandwidths at 608. The UE 602 can then receive the MB service communicated over an MB bandwidth that is of the MB bandwidth size from the base station 604 at 610.

Figure 7:
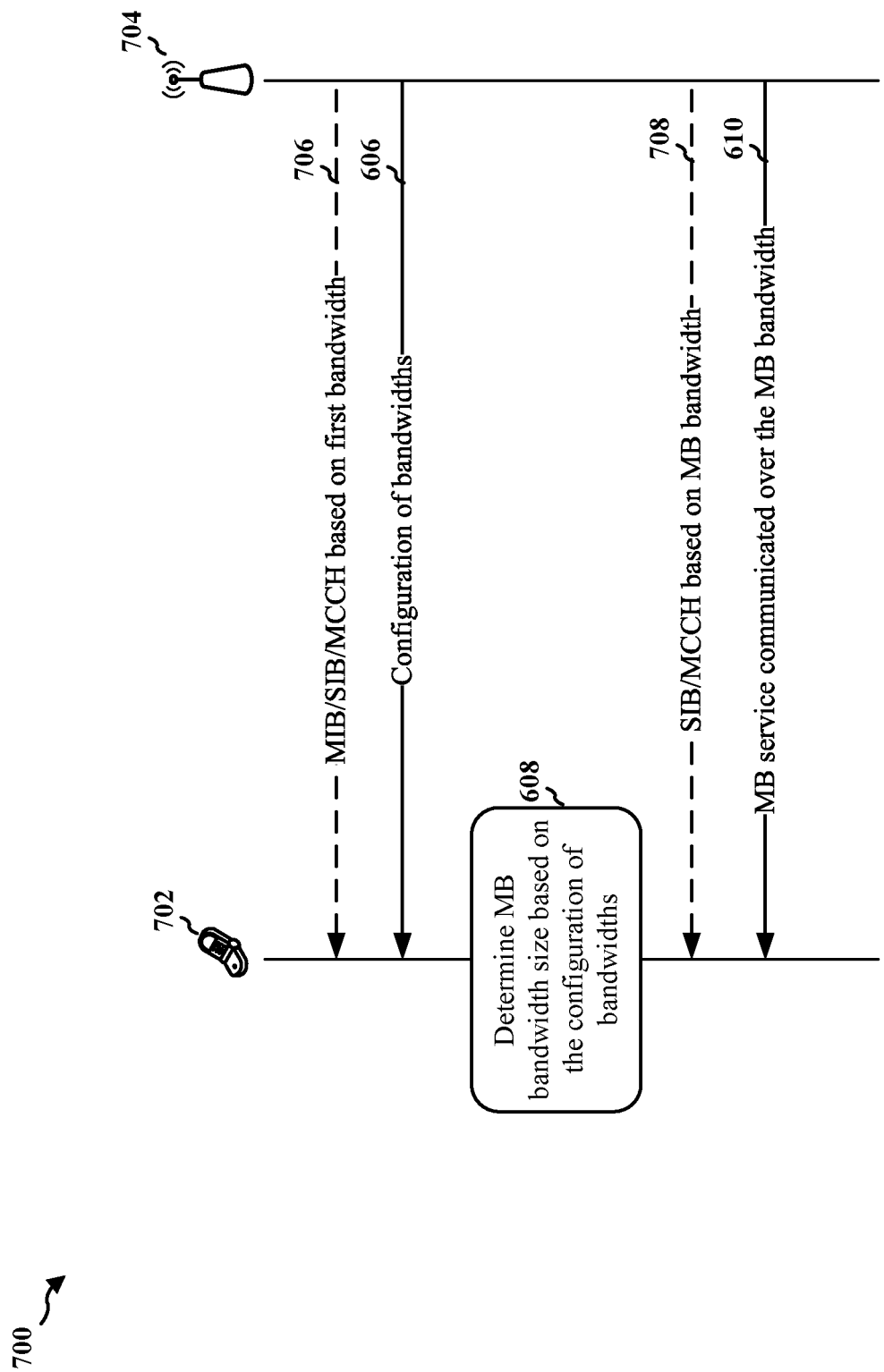
FIG. 7 illustrates an example of a system 700 for determining an MB bandwidth size for receiving a MB service based on an initial system bandwidth in accordance with some aspects of the present disclosure.

FIG. 7 illustrates an example of a system 700 for determining an MB bandwidth size for receiving a MB service based on an initial system bandwidth in accordance with some aspects of the present disclosure. System 700 includes a UE 702 and a base station 704 that can communicate to configure a MB service, as described herein. For example, the base station 704 can transmit one or more of a MIB, one or more SIBs, or a MCCH based on a first bandwidth at 706. As described, the first bandwidth can be one of multiple configurable bandwidth sizes that can be configured for unicast services and indicated in the MIB (as described above). For example, the UE 702 can decode the MIB, SIB, MCCH based on the first bandwidth. For example, the base station 704 can transmit a configuration of bandwidths to the UE 702 at 606, as described in reference to FIG. 6. As described, the configuration of bandwidths 606 can include an indication of a MB bandwidth (for example, in one or more SIBs, in MCCH, or other signaling). The UE 702 can determine a MB bandwidth size based on the configuration of bandwidths at 608. The UE 702 can then receive additional SIB or MCCH based on the MB bandwidth size from the base station 704 at 708, and can accordingly decode the additional SIB or MCCH based on the MB bandwidth size. The UE 702 can also receive the MB service communicated over an MB bandwidth that is of the MB bandwidth size from the base station 704 at 610.

Figure 8:
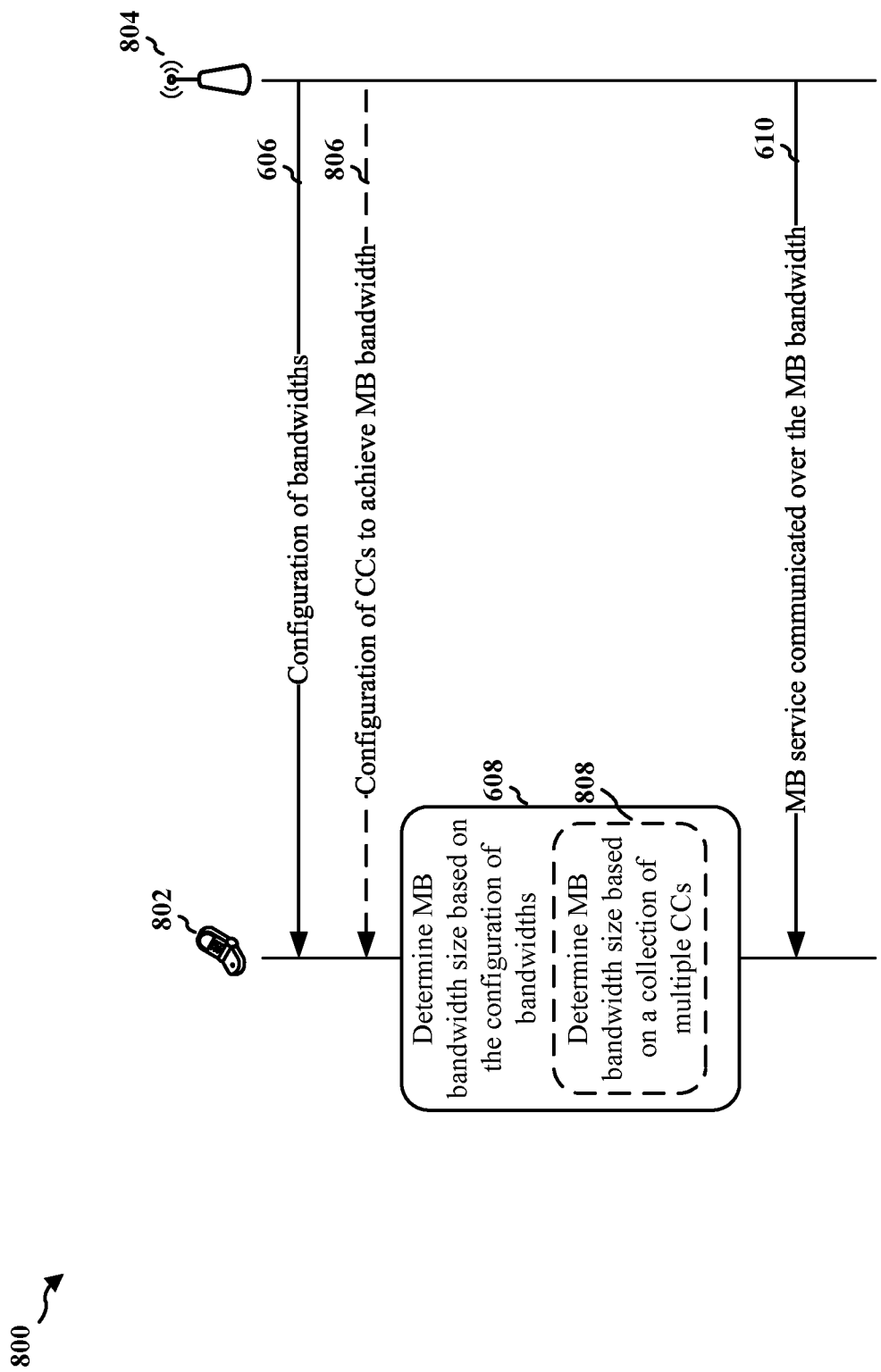
FIG. 8 illustrates an example of a system 800 for determining an MB bandwidth size for receiving a MB service based on a collection of multiple CCs in accordance with some aspects of the present disclosure.

FIG. 8 illustrates an example of a system 800 for determining an MB bandwidth size for receiving a MB service based on a collection of multiple CCs in accordance with some aspects of the present disclosure. System 800 includes a UE 802 and a base station 804 that can communicate to configure a MB service, as described herein. For example, the base station 804 can transmit a configuration of bandwidths to the UE 802 at 606, as described in reference to FIG. 6. As described, the configuration of bandwidths 606 can include a configuration of configurable bandwidth sizes for unicast services or otherwise defined by a radio access technology (for example, NR or LTE). In addition, for example, the configuration of bandwidths can include configurations of bandwidth sizes for multiple CCs. The UE 802 can also receive a configuration of CCs to achieve the MB bandwidth size from the base station 804 at 806, which can indicate a relationship between multiple CCs for the MB service. The UE 802 can determine a MB bandwidth size based on the configuration of bandwidths at 608, which can also include determining the MB bandwidth size based on a collection of multiple CCs at 808 that are combined to achieve the MB bandwidth size. The UE 802 can receive the MB service communicated over an MB bandwidth that is of the MB bandwidth size (for example over the multiple CCs) from the base station 804 at 610.

Figure 9:
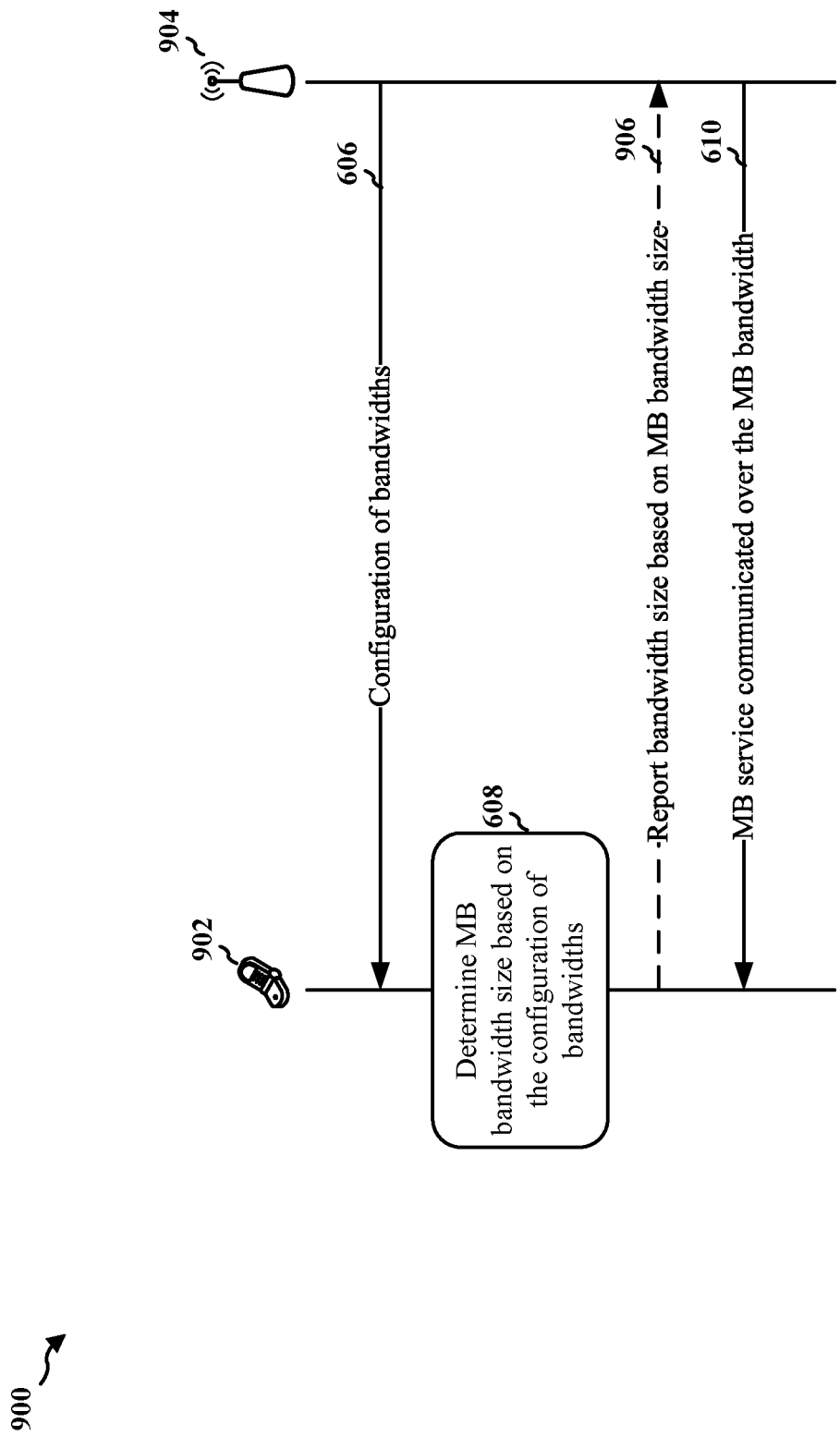
FIG. 9 illustrates an example of a system 900 for reporting an MB bandwidth size for receiving a MB service in accordance with some aspects of the present disclosure.

FIG. 9 illustrates an example of a system 900 for reporting an MB bandwidth size for receiving a MB service in accordance with some aspects of the present disclosure. System 900 includes a UE 902 and a base station 904 that can communicate to configure a MB service, as described herein. For example, the base station 904 can transmit a configuration of bandwidths to the UE 902 at 606. As described, the configuration of bandwidths 906 can include a configuration of configurable bandwidth sizes for unicast services or otherwise defined by a radio access technology (for example, NR or LTE). The UE 902 can determine a MB bandwidth size based on the configuration of bandwidths at 608, as described. The UE 902 can then report a bandwidth size to the base station 904 based on the MB bandwidth size at 906. For example, the UE 902 can report the MB bandwidth size of the desired MB service, a minimum bandwidth size of the configurable bandwidth sizes for unicast services indicated in the configuration at 606 that is higher than the MB bandwidth size, as described. The UE 902 can then receive the MB service communicated over an MB bandwidth that is of the MB bandwidth size from the base station 904 at 610.

Figure 10:
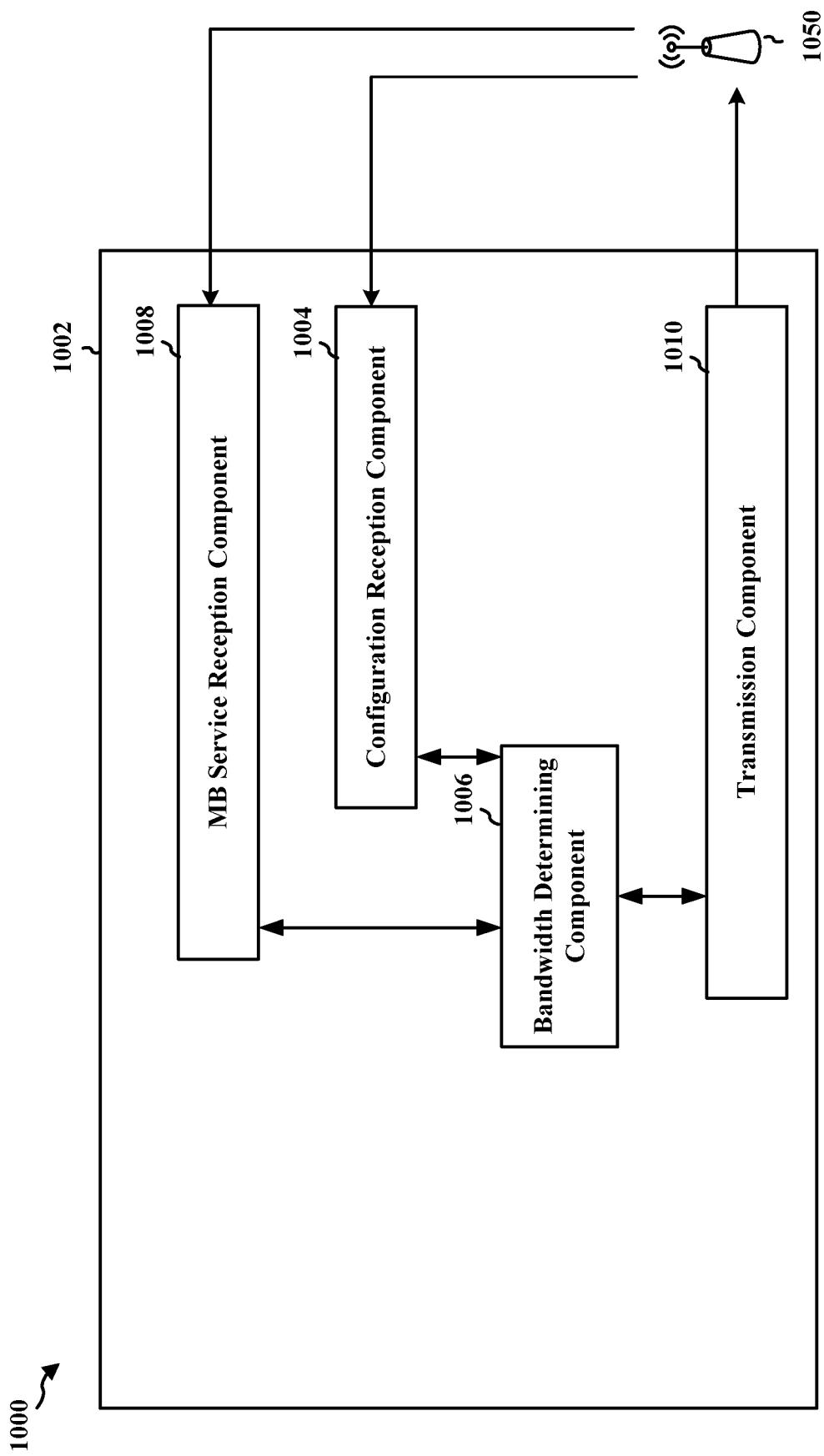
FIG. 10 is a conceptual data flow diagram illustrating the data flow between different components in an example apparatus, such as a UE, in accordance with some aspects of the present disclosure.

FIG. 10 is a conceptual data flow diagram 1000 illustrating the data flow between different means/components in an example apparatus 1002. The apparatus may be a UE or may include a portion of the UE, such as a communicating component 198, that can communicate with a base station 1050. The apparatus includes a configuration reception component 1004 that receives a configuration for a first set of multiple configurable bandwidth sizes for receiving unicast services, such as described in connection with Block 402 of method 400 in FIG. 4. The apparatus includes a bandwidth determining component 1006 that determines a MB bandwidth size for receiving a MB service, such as described in connection with Block 404 of method 400 in FIG. 4. The apparatus includes a MB service reception component 1008 that receives the MB service over an MB bandwidth of the MB bandwidth size, such as described in connection with Block 406 of method 400 in FIG. 4. The apparatus includes a transmission component 1010 for transmitting certain communications, such as a report of MB bandwidth size as described in other examples herein.

The apparatus may include additional components that perform each of the blocks of the algorithm in the aforementioned flowcharts of FIG. 4. As such, each block in the aforementioned flowcharts of FIG. 4 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
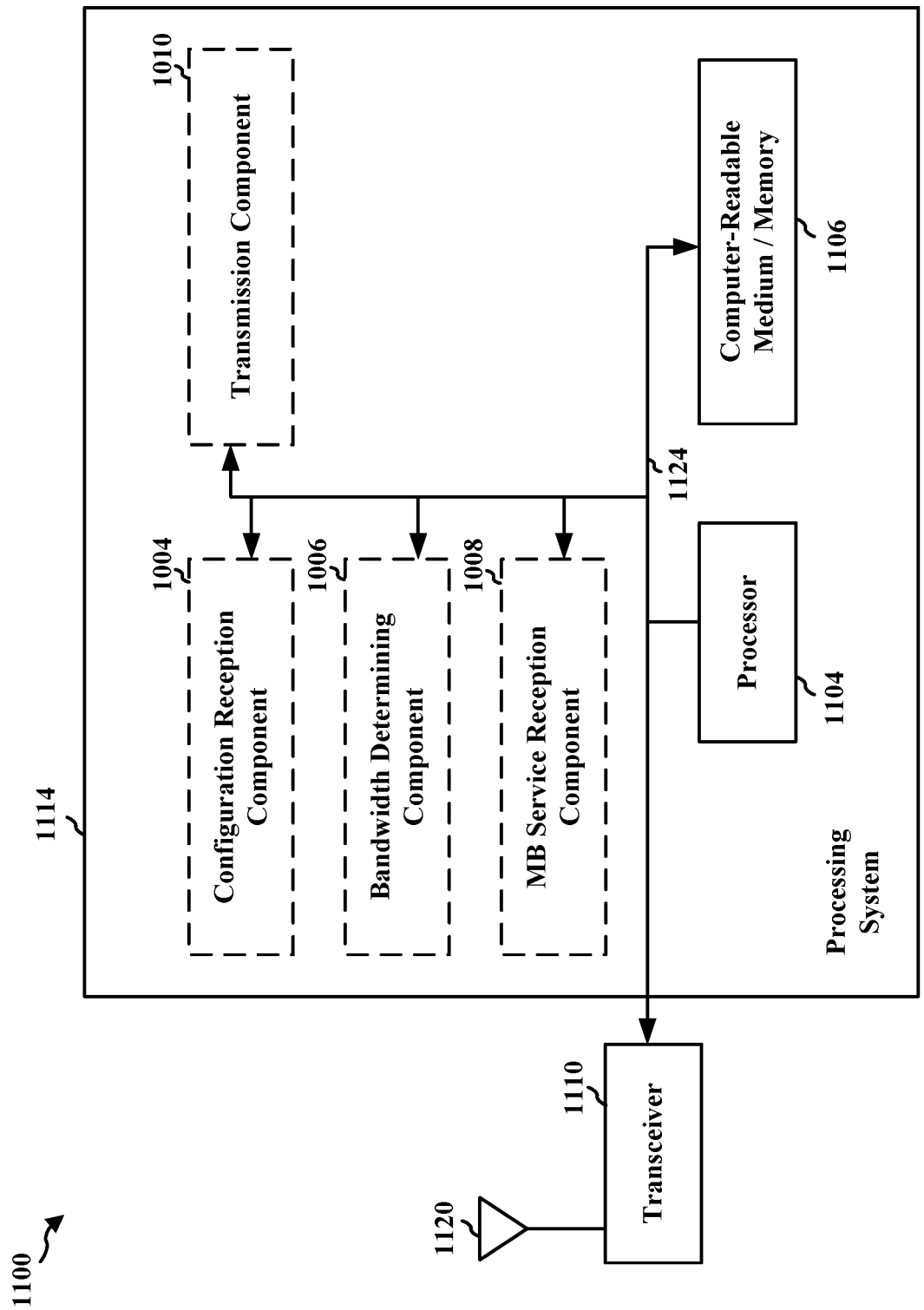
FIG. 11 is a diagram illustrating an example of a hardware implementation for an apparatus, such as a UE, employing a processing system in accordance with some aspects of the present disclosure.

FIG. 11 is a diagram 1100 illustrating an example of a hardware implementation for an apparatus employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors or hardware components, represented by the processor 1104, the components 1004, 1006, 1008, and 1010, and the computer-readable medium/memory 1106. The bus 1124 may also link various other circuits such as timing sources, peripherals, voltage regulators, and power management circuits.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the configuration reception component 1004, MB service reception component 1008, etc. In addition, the transceiver 1110 receives information from the processing system 1114, specifically the transmission component 1010, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described herein for any particular apparatus. The computer-readable medium/memory 1106 may also be used for storing data that is manipulated by the processor 1104 when executing software. The processing system 1114 further includes at least one of the components 1004, 1006, 1008, and 1010. The components may be software components running in the processor 1104, resident/stored in the computer readable medium/memory 1106, one or more hardware components coupled to the processor 1104, or some combination thereof. The processing system 1114 may be a component of the UE 350 and may include the memory 360 or at least one of the TX processor 368, the RX processor 356, and the controller/processor 359. Alternatively, the processing system 1114 may be the entire UE (such as UE 350 of FIG. 3).

In one configuration, the hardware implementation of the apparatus for wireless communication includes means for means for receiving a configuration for a first set of multiple configurable bandwidth sizes for receiving unicast services, means for determining a MB bandwidth size for receiving an MB service, the MB bandwidth size being outside of the set of multiple configurable bandwidth sizes for receiving unicast services; and means for receiving the MB service over an MB bandwidth of the MB bandwidth size. The aforementioned means may be one or more of the aforementioned components of the apparatus 1002 or the processing system 1114 of the apparatus 1002 configured to perform the functions recited by the aforementioned means. As described herein, the processing system 1114 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 12:
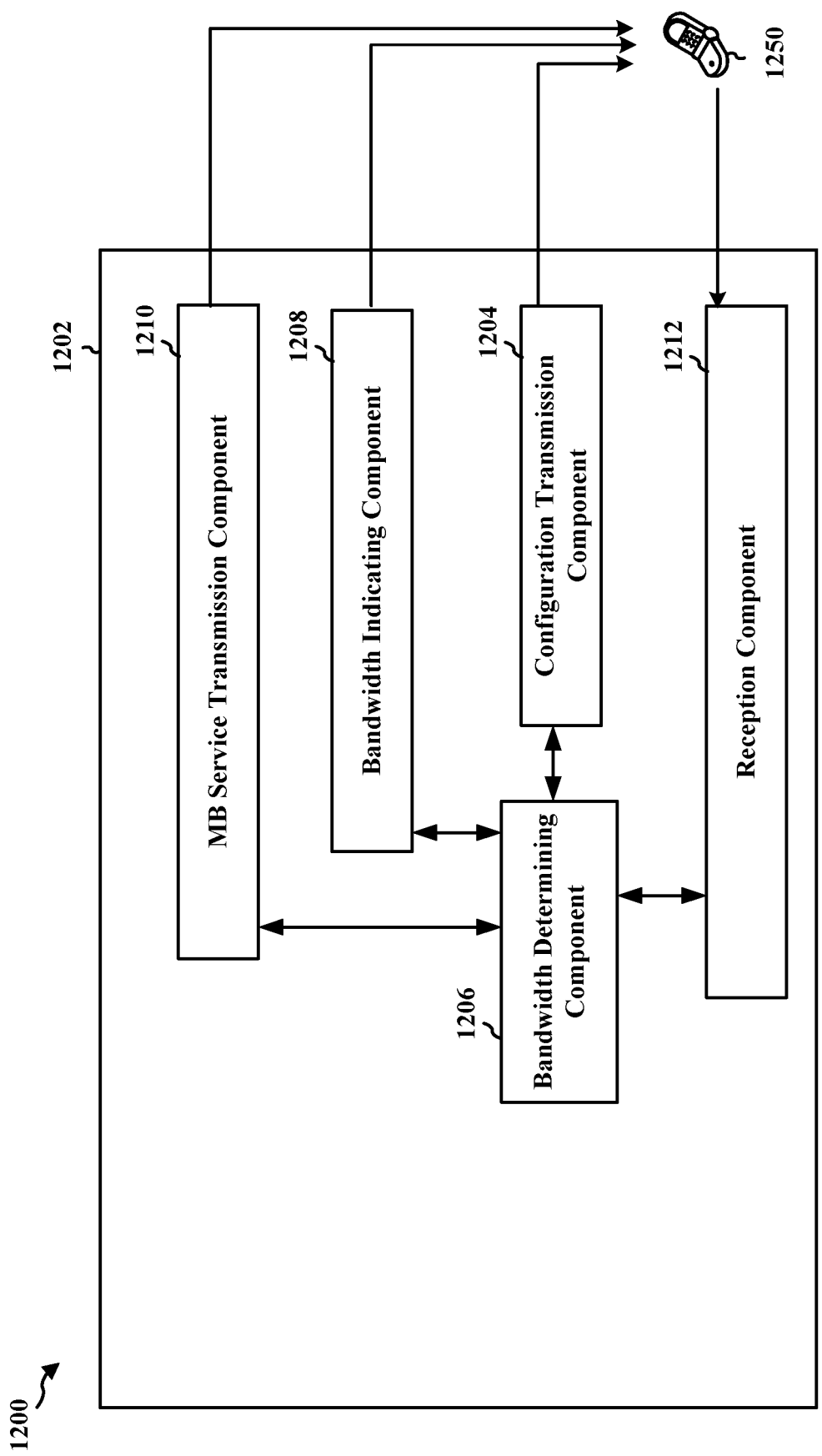
FIG. 12 is a conceptual data flow diagram illustrating the data flow between different components in an example apparatus, such as a base station, in accordance with some aspects of the present disclosure.

FIG. 12 is a conceptual data flow diagram 1200 illustrating the data flow between different means/components in an example apparatus 1202. The apparatus may be a base station or may include a portion of the base station, such as a configuring component 199, that can communicate with a UE 1250. The apparatus includes a configuration transmission component 1204 that transmits a configuration for a first set of multiple configurable bandwidth sizes for receiving unicast services, such as described in connection with Block 502 of method 500 in FIG. 5. The apparatus includes a bandwidth determining component 1206 that determines a MB bandwidth size of an MB bandwidth for receiving a MB service, such as described in connection with Block 504 of method 500 in FIG. 5. The apparatus includes a bandwidth indicating component 1208 that transmits an indication of the MB bandwidth or MB bandwidth size, such as described in connection with Block 506 of method 500 in FIG. 5. The apparatus includes a MB service transmission component 1210 that transmits the MB service over an MB bandwidth of the MB bandwidth size, such as described in connection with Block 508 of method 500 in FIG. 5. The apparatus includes a reception component 1212 for receiving certain communications, such as a report of MB bandwidth size as described in other examples herein.

The apparatus may include additional components that perform each of the blocks of the algorithm in the aforementioned flowcharts of FIG. 5. As such, each block in the aforementioned flowcharts of FIG. 5 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 13:
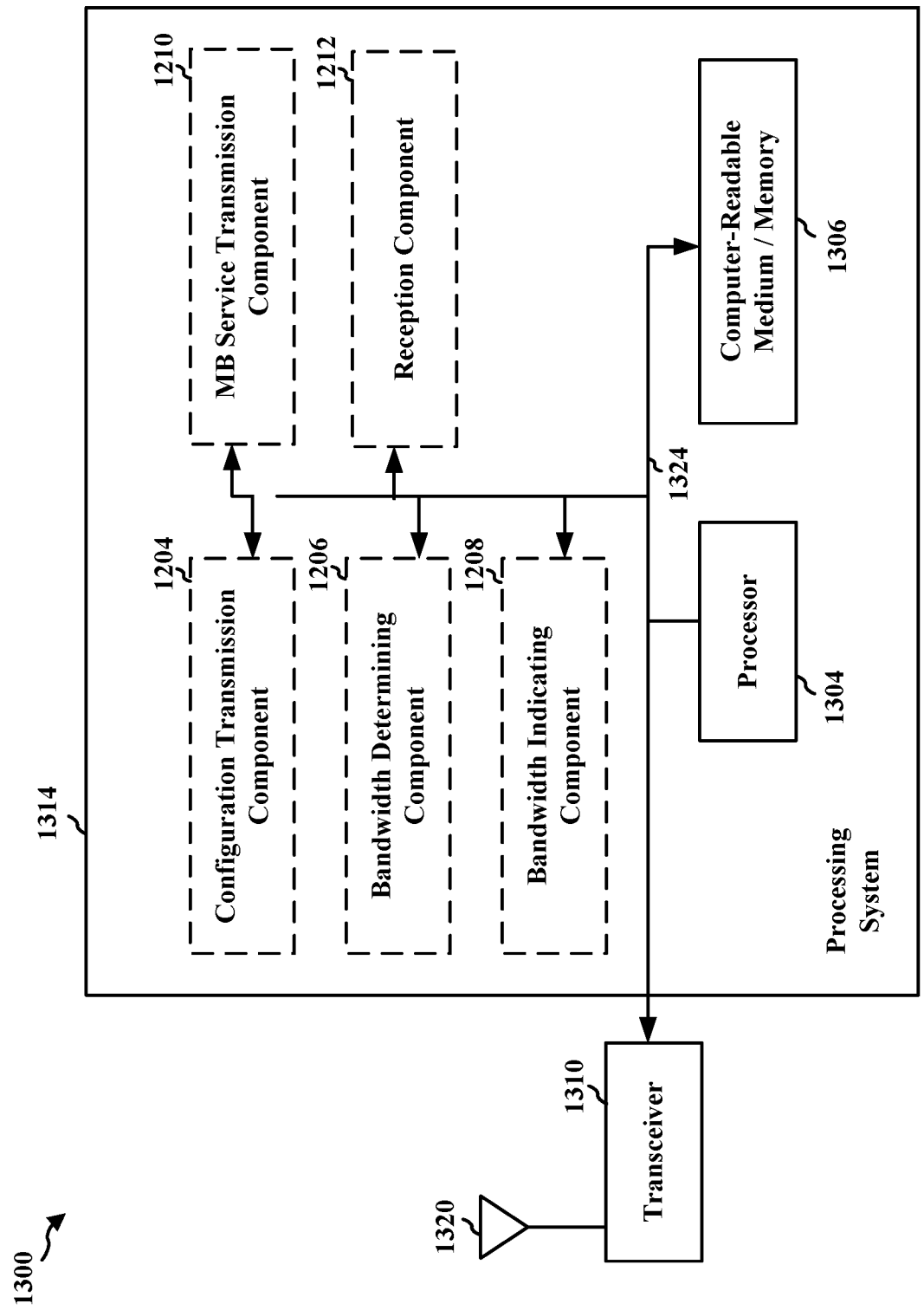
FIG. 13 is a diagram illustrating an example of a hardware implementation for an apparatus, such as a base station, employing a processing system in accordance with some aspects of the present disclosure

FIG. 13 is a diagram 1300 illustrating an example of a hardware implementation for an apparatus employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors or hardware components, represented by the processor 1304, the components 1204, 1206, 1208, 1210, and 1212, and the computer-readable medium/memory 1306. The bus 1324 may also link various other circuits such as timing sources, peripherals, voltage regulators, and power management circuits.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the reception component 1212, etc. In addition, the transceiver 1310 receives information from the processing system 1314, specifically the configuration transmission component 1204, bandwidth indicating component 1208, MB service transmission component 1210, etc., and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described herein for any particular apparatus. The computer-readable medium/memory 1306 may also be used for storing data that is manipulated by the processor 1304 when executing software. The processing system 1314 further includes at least one of the components 1204, 1206, 1208, 1210, and 1212. The components may be software components running in the processor 1304, resident/stored in the computer readable medium/memory 1306, one or more hardware components coupled to the processor 1304, or some combination thereof. The processing system 1314 may be a component of the base station 310 and may include the memory 376 or at least one of the TX processor 316, the RX processor 370, and the controller/processor 375. Alternatively, the processing system 1314 may be the entire base station (such as base station 310 of FIG. 3).

In one configuration, the apparatus 1202 for wireless communication includes means for transmitting, in a cell, a configuration for a first set of multiple configurable bandwidth sizes for receiving unicast services, determining a MB bandwidth size for transmitting an MB service, the MB bandwidth size being outside of the set of multiple configurable bandwidth sizes for receiving unicast services, transmitting an indication of the MB bandwidth size, and transmitting, in the cell, the MB service over an MB bandwidth of the MB bandwidth size. The aforementioned means may be one or more of the aforementioned components of the apparatus 1202 or the processing system 1314 of the apparatus 1202 configured to perform the functions recited by the aforementioned means. As described herein, the processing system 1314 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

The following aspects are illustrative only and aspects thereof may be combined with aspects of other embodiments or teaching described herein, without limitation.

Aspect 1 is a method of wireless communication including receiving, by a UE, a configuration for a first set of multiple configurable bandwidth sizes for receiving unicast services, determining a MB bandwidth size for receiving an MB service, the MB bandwidth size being different than each bandwidth size in the set of multiple configurable bandwidth sizes for receiving unicast services, and receiving the MB service over an MB bandwidth of the MB bandwidth size.

In Aspect 2, the method of Aspect 1 includes wherein the configuration includes a MIB that indicates a second set of configurable bandwidth sizes defined for receiving unicast or MB services, wherein the second set of configurable bandwidth sizes defined for receiving unicast or MB services includes the first set of multiple configurable bandwidth sizes for receiving unicast services and at least the MB bandwidth size, and wherein determining the MB bandwidth size is based on determining, from the configuration one of the second set of configurable bandwidth sizes.

In Aspect 3, the method of Aspect 2 includes wherein the second set of configurable bandwidth sizes defined for receiving unicast or MB services includes one or more additional MB bandwidth sizes.

In Aspect 4, the method of any of Aspects 2 or 3 includes wherein the second set of configurable bandwidth sizes defined for receiving unicast or MB services includes an indicator of an information element within the MIB that indicates the MB bandwidth size and one or more additional MB bandwidth sizes.

In Aspect 5, the method of any of Aspects 1 to 4 includes wherein the configuration includes a MIB that indicates one bandwidth size of the first set of multiple configurable bandwidth sizes for receiving unicast services, and wherein determining the MB bandwidth size includes substituting the MB bandwidth size for the one bandwidth size of the first set of multiple configurable bandwidth sizes based on a frequency range associated with a cell in which the UE is located.

In Aspect 6, the method of any of Aspects 1 to 5 includes wherein the configuration includes a MIB that indicates one bandwidth size of the first set of multiple configurable bandwidth sizes for receiving unicast services and that indicates a SIB, wherein the method further includes receiving the SIB, and wherein determining the MB bandwidth size is further based on one or more information elements in the SIB that indicate the MB bandwidth size as being different than the one bandwidth size.

In Aspect 7, the method of Aspect 6 includes wherein the MB bandwidth size is larger than the one bandwidth size of the first set of multiple configurable bandwidth sizes for receiving unicast services.

In Aspect 8, the method of any of Aspects 6 or 7 includes wherein the SIB configures a MBSFN area for the MB service.

In Aspect 9, the method of any of Aspects 6 to 8 includes decoding the SIB based on the one bandwidth size of the first set of multiple configurable bandwidth sizes for receiving unicast services, and decoding a subsequent SIB based on the MB bandwidth size.

In Aspect 10, the method of Aspect 6 includes wherein the MB bandwidth size is smaller than the one bandwidth size of the first set of multiple configurable bandwidth sizes for receiving unicast services, and wherein the method further includes decoding the SIB, one or more previous SIBs, or a downlink control channel based on the one bandwidth size of the set of multiple configurable bandwidth sizes for receiving unicast services.

In Aspect 11, the method of any of Aspects 1 to 10 includes wherein the configuration includes a MIB that indicates one bandwidth size of the first set of multiple configurable bandwidth sizes for receiving unicast services, wherein the method further includes receiving, in a control channel, a broadcast channel information list, and wherein determining the MB bandwidth size is based on the broadcast channel information list.

In Aspect 12, the method of Aspect 11 includes decoding the control channel based on the one bandwidth size of the first set of multiple configurable bandwidth sizes for receiving unicast services, and decoding a subsequent control channel based on the MB bandwidth size.

In Aspect 13, the method of any of Aspects 1 to 12 includes wherein receiving the MB service over the MB bandwidth includes receiving the MB service via multiple CCs, each of the multiple CCs having a bandwidth size of the first set of multiple configurable bandwidth sizes that is smaller than the MB bandwidth size.

In Aspect 14, the method of Aspect 13 includes receiving, over a control channel for the MB service, an indication to receive the MB service over the multiple CCs.

In Aspect 15, the method of any of Aspects 13 or 14 includes determining, based on a SIB indicating a MBSFN area for the MB service, to receive the MB service over the multiple CCs.

In Aspect 16, the method of any of Aspects 1 to 15 includes determining one bandwidth size of the first set of multiple configurable bandwidth sizes for receiving unicast services that is a smallest bandwidth size of the first set that is larger than the MB bandwidth size, and reporting, to a cell, the one bandwidth size that is the smallest bandwidth size of the first set that is larger than the MB bandwidth size, wherein receiving the MB service is based on the reporting.

In Aspect 17, the method of any of Aspects 1 to 16 includes reporting, to a cell, an indication of the MB bandwidth size, wherein receiving the MB service is based on reporting the indication of the MB bandwidth size to the cell.

Aspect 18 is a method of wireless communication including transmitting, in a cell, a configuration for a first set of multiple configurable bandwidth sizes for receiving unicast services, determining a MB bandwidth size for transmitting an MB service, the MB bandwidth size being different than each bandwidth size in the set of multiple configurable bandwidth sizes for receiving unicast services, transmitting an indication of the MB bandwidth size, and transmitting, in the cell, the MB service over an MB bandwidth of the MB bandwidth size.

In Aspect 19, the method of Aspect 18 includes wherein the configuration includes a MIB that indicates a second set of configurable bandwidth sizes defined for receiving unicast or MB services, wherein the second set of configurable bandwidth sizes defined for receiving unicast or MB services includes the first set of multiple configurable bandwidth sizes for receiving unicast services and at least the MB bandwidth size, and wherein transmitting the indication of the MB bandwidth size includes indicating the MB bandwidth size in the configuration.

In Aspect 20, the method of Aspect 19 includes wherein the second set of configurable bandwidth sizes defined for receiving unicast or MB services includes one or more additional MB bandwidth sizes.

In Aspect 21, the method of any of Aspects 19 or 20 includes wherein the second set of configurable bandwidth sizes defined for receiving unicast or MB services includes an indicator of an information element within the MIB that indicates the MB bandwidth size and one or more additional MB bandwidth sizes.

In Aspect 22, the method of any of Aspects 18 to 21 includes wherein the configuration includes a MIB that indicates one bandwidth size of the first set of multiple configurable bandwidth sizes for receiving unicast services, and wherein transmitting the indication of the MB bandwidth size includes substituting the MB bandwidth size for the one bandwidth size of the first set of multiple configurable bandwidth sizes based on a frequency range associated with the cell.

In Aspect 23, the method of any of Aspects 18 to 22 includes wherein the configuration includes a MIB that indicates one bandwidth size of the first set of multiple configurable bandwidth sizes for receiving unicast services and that indicates a SIB, wherein transmitting the indication includes transmitting the SIB, and indicating the MB bandwidth size as being different than the one bandwidth size in one or more information elements in the SIB.

In Aspect 24, the method of Aspect 23 includes wherein the MB bandwidth size is larger than the one bandwidth size of the first set of multiple configurable bandwidth sizes for receiving unicast services.

In Aspect 25, the method of any of Aspects 23 or 24 includes wherein the SIB configures a MBSFN area for the MB service.

In Aspect 26, the method of any of Aspects 23 to 25 includes wherein transmitting the SIB is based on the one bandwidth size of the first set of multiple configurable bandwidth sizes for receiving unicast services, and transmitting a subsequent SIB is based on the MB bandwidth size.

In Aspect 27, the method of Aspect 23 includes wherein the MB bandwidth size is smaller than the one bandwidth size of the first set of multiple configurable bandwidth sizes for receiving unicast services, and wherein transmitting the SIB, one or more previous SIBs, or a downlink control channel is based on the one bandwidth size of the set of multiple configurable bandwidth sizes for receiving unicast services.

In Aspect 28, the method of any of Aspects 18 to 27 includes wherein the configuration includes a MIB that indicates one bandwidth size of the first set of multiple configurable bandwidth sizes for receiving unicast services, wherein transmitting the indicator includes transmitting, in a control channel, a broadcast channel information list that includes the MB bandwidth size.

In Aspect 29, the method of Aspect 28 includes transmitting the control channel based on the one bandwidth size of the first set of multiple configurable bandwidth sizes for receiving unicast services, and transmitting a subsequent control channel based on the MB bandwidth size.

In Aspect 30, the method of any of Aspects 18 to 29 includes wherein transmitting the MB service includes transmitting the MB service via multiple CCs, each of the multiple CCs having a bandwidth size of the first set of multiple configurable bandwidth sizes that is smaller than the MB bandwidth size.

In Aspect 31, the method of Aspect 30 includes wherein transmitting the indication includes transmitting, over a control channel for the MB service, the indication to receive the MB service over the multiple CCs.

In Aspect 32, the method of any of Aspects 30 or 31 includes wherein transmitting the indication includes indicating, in a SIB for a MBSFN area for the MB service, to receive the MB service over the multiple CCs.

In Aspect 33, the method of any of Aspects 18 to 32 includes receiving, from a UE, an indication of the MB bandwidth size, wherein transmitting the MB service is based on the indication of the MB bandwidth size.

Aspect 34 is an apparatus for wireless communication including a transceiver, a memory configured to store instructions, and one or more processors communicatively coupled with the memory and the transceiver, wherein the one or more processors are configured to receive a configuration for a first set of multiple configurable bandwidth sizes for receiving unicast services, determine a MB bandwidth size for receiving an MB service, the MB bandwidth size being different than each bandwidth size in the set of multiple configurable bandwidth sizes for receiving unicast services, and receive the MB service over an MB bandwidth of the MB bandwidth size.

In Aspect 35, the apparatus of Aspect 34 includes wherein the configuration includes a MIB that indicates a second set of configurable bandwidth sizes defined for receiving unicast or MB services, wherein the second set of configurable bandwidth sizes defined for receiving unicast or MB services includes the first set of multiple configurable bandwidth sizes for receiving unicast services and at least the MB bandwidth size, and wherein the one or more processors are configured to determine the MB bandwidth size based on determining, from the configuration one of the second set of configurable bandwidth sizes.

In Aspect 36, the apparatus of Aspect 35 includes wherein the second set of configurable bandwidth sizes defined for receiving unicast or MB services includes one or more additional MB bandwidth sizes.

In Aspect 37, the apparatus of any of Aspects 35 or 36 includes wherein the second set of configurable bandwidth sizes defined for receiving unicast or MB services includes an indicator of an information element within the MIB that indicates the MB bandwidth size and one or more additional MB bandwidth sizes.

In Aspect 38, the apparatus of any of Aspects 34 to 36 includes wherein the configuration includes a MIB that indicates one bandwidth size of the first set of multiple configurable bandwidth sizes for receiving unicast services, and wherein the one or more processors are configured to determine the MB bandwidth size at least in part by substituting the MB bandwidth size for the one bandwidth size of the first set of multiple configurable bandwidth sizes based on a frequency range associated with a cell in which the apparatus is located.

In Aspect 39, the apparatus of any of Aspects 34 to 37 includes wherein the configuration includes a MIB that indicates one bandwidth size of the first set of multiple configurable bandwidth sizes for receiving unicast services and that indicates a SIB, wherein the one or more processors are further configured to receive the SIB, and wherein the one or more processors are configured to determine the MB bandwidth size further based on one or more information elements in the SIB that indicate the MB bandwidth size as being different than the one bandwidth size.

In Aspect 40, the apparatus of Aspect 39 includes wherein the MB bandwidth size is larger than the one bandwidth size of the first set of multiple configurable bandwidth sizes for receiving unicast services.

In Aspect 41, the apparatus of any of Aspects 39 or 40 includes wherein the SIB configures a MBSFN area for the MB service.

In Aspect 42, the apparatus of any of Aspects 39 to 41 includes wherein the one or more processors are further configured to decode the SIB based on the one bandwidth size of the first set of multiple configurable bandwidth sizes for receiving unicast services and to decode a subsequent SIB based on the MB bandwidth size.

In Aspect 43, the apparatus of Aspect 39 includes wherein the MB bandwidth size is smaller than the one bandwidth size of the first set of multiple configurable bandwidth sizes for receiving unicast services, and wherein the one or more processors are further configured to decode the SIB, one or more previous SIBs, or a downlink control channel based on the one bandwidth size of the set of multiple configurable bandwidth sizes for receiving unicast services.

In Aspect 44, the apparatus of any of Aspects 34 to 43 includes wherein the configuration includes a MIB that indicates one bandwidth size of the first set of multiple configurable bandwidth sizes for receiving unicast services, wherein the one or more processors are further configured to receive, in a control channel, a broadcast channel information list, and wherein the one or more processors are configured to determine the MB bandwidth size based on the broadcast channel information list.

In Aspect 45, the apparatus of Aspect 44 includes wherein the one or more processors are further configured to decode the control channel based on the one bandwidth size of the first set of multiple configurable bandwidth sizes for receiving unicast services and to decode a subsequent control channel based on the MB bandwidth size.

In Aspect 46, the apparatus of any of Aspects 34 to 45 includes wherein the one or more processors are configured to receive the MB service over the MB bandwidth at least in part by receiving the MB service via multiple CCs, each of the multiple CCs having a bandwidth size of the first set of multiple configurable bandwidth sizes that is smaller than the MB bandwidth size.

In Aspect 47, the apparatus of Aspect 46 includes wherein the one or more processors are further configured to receive, over a control channel for the MB service, an indication to receive the MB service over the multiple CCs.

In Aspect 48, the apparatus of any of Aspects 46 or 47 includes wherein the one or more processors are further configured to determine, based on a SIB indicating a MBSFN area for the MB service, to receive the MB service over the multiple CCs.

In Aspect 49, the apparatus of any of Aspects 34 to 48 includes wherein the one or more processors are further configured to determine one bandwidth size of the first set of multiple configurable bandwidth sizes for receiving unicast services that is a smallest bandwidth size of the first set that is larger than the MB bandwidth, and report, to a cell, the one bandwidth size that is the smallest bandwidth size of the first set that is larger than the MB bandwidth size, wherein the one or more processors are configured to receive the MB service based on the reporting.

In Aspect 50, the apparatus of any of Aspects 34 to 49 includes wherein the one or more processors are further configured to report, to a cell, an indication of the MB bandwidth size, wherein receiving the MB service is based on reporting the indication of the MB bandwidth size to the cell.

Aspect 51 is an apparatus for wireless communication including a transceiver, a memory configured to store instructions, and one or more processors communicatively coupled with the memory and the transceiver, wherein the one or more processors are configured to transmit, in a cell, a configuration for a first set of multiple configurable bandwidth sizes for receiving unicast services, determine a MB bandwidth size for transmitting an MB service, the MB bandwidth size being different than each bandwidth size in the set of multiple configurable bandwidth sizes for receiving unicast services, transmit an indication of the MB bandwidth, and transmit, in the cell, the MB service over an MB bandwidth of the MB bandwidth size.

In Aspect 52, the apparatus of Aspect 51 includes wherein the configuration includes a MIB that indicates a second set of configurable bandwidth sizes defined for receiving unicast or MB services, wherein the second set of configurable bandwidth sizes defined for receiving unicast or MB services includes the first set of multiple configurable bandwidth sizes for receiving unicast services and at least the MB bandwidth size, and wherein the one or more processors are configured to transmit the indication of the MB bandwidth size in the configuration.

In Aspect 53, the apparatus of Aspect 52 includes wherein the second set of configurable bandwidth sizes defined for receiving unicast or MB services includes one or more additional MB bandwidth sizes.

In Aspect 54, the apparatus of any of Aspects 52 or 53 includes wherein the second set of configurable bandwidth sizes defined for receiving unicast or MB services includes an indicator of an information element within the MIB that indicates the MB bandwidth size and one or more additional MB bandwidth sizes.

In Aspect 55, the apparatus of any of Aspects 51 to 54 includes wherein the configuration includes a MIB that indicates one bandwidth size of the first set of multiple configurable bandwidth sizes for receiving unicast services, and wherein the one or more processors are configured to transmit the indication of the MB bandwidth size at least in part by substituting the MB bandwidth size for the one bandwidth size of the first set of multiple configurable bandwidth sizes based on a frequency range associated with the cell.

In Aspect 56, the apparatus of any of Aspects 51 to 55 includes wherein the configuration includes a MIB that indicates one bandwidth size of the first set of multiple configurable bandwidth sizes for receiving unicast services and that indicates a SIB, wherein the one or more processors are configured to transmit the SIB, and indicating the MB bandwidth size as being different than the one bandwidth size in one or more information elements in the SIB.

In Aspect 57, the apparatus of Aspect 56 includes wherein the MB bandwidth size is larger than the one bandwidth size of the first set of multiple configurable bandwidth sizes for receiving unicast services.

In Aspect 58, the apparatus of any of Aspects 56 or 57 includes wherein the SIB configures a MBSFN area for the MB service.

In Aspect 59, the apparatus of any of Aspects 56 to 58 includes wherein the one or more processors are configured to transmit the SIB based on the one bandwidth size of the first set of multiple configurable bandwidth sizes for receiving unicast services and to transmit a subsequent SIB is based on the MB bandwidth size.

In Aspect 60, the apparatus of Aspect 56 includes wherein the MB bandwidth size is smaller than the one bandwidth size of the first set of multiple configurable bandwidth sizes for receiving unicast services, and wherein the one or more processors are configured to transmit the SIB, one or more previous SIBs, or a downlink control channel based on the one bandwidth size of the set of multiple configurable bandwidth sizes for receiving unicast services.

In Aspect 61, the apparatus of any of Aspects 51 to 60 includes wherein the configuration includes a MIB that indicates one bandwidth size of the first set of multiple configurable bandwidth sizes for receiving unicast services, wherein the one or more processors are configured to transmit, in a control channel, a broadcast channel information list that includes the MB bandwidth size.

In Aspect 62, the apparatus of Aspect 61 includes wherein the one or more processors are further configured to transmit the control channel based on the one bandwidth size of the first set of multiple configurable bandwidth sizes for receiving unicast services and to transmit a subsequent control channel based on the MB bandwidth size.

In Aspect 63, the apparatus of any of Aspects 51 to 62 includes wherein the one or more processors are configured to transmit the MB service via multiple CCs, each of the multiple CCs having a bandwidth size of the first set of multiple configurable bandwidth sizes that is smaller than the MB bandwidth size.

In Aspect 64, the apparatus of Aspect 63 includes wherein the one or more processors are configured to transmit, over a control channel for the MB service, the indication to receive the MB service over the multiple CCs.

In Aspect 65, the apparatus of any of Aspects 63 or 64 includes wherein the one or more processors are configured to transmit the indication at least in part by indicating, in a SIB for a MBSFN area for the MB service, to receive the MB service over the multiple CCs.

In Aspect 66, the apparatus of any of Aspects 51 to 65 includes wherein the one or more processors are further configured to receive, from a UE, an indication of the MB bandwidth size, wherein the one or more processors are configured to transmit the MB service based on the indication of the MB bandwidth size.

Aspect 67 is an apparatus for wireless communication including means for receiving a configuration for a first set of multiple configurable bandwidth sizes for receiving unicast services, means for determining a MB bandwidth size for receiving an MB service, the MB bandwidth size being different than each bandwidth size in the set of multiple configurable bandwidth sizes for receiving unicast services, and means for receiving the MB service over an MB bandwidth of the MB bandwidth size.

In Aspect 68, the apparatus of Aspect 67 includes wherein the configuration includes a MIB that indicates a second set of configurable bandwidth sizes defined for receiving unicast or MB services, wherein the second set of configurable bandwidth sizes defined for receiving unicast or MB services includes the first set of multiple configurable bandwidth sizes for receiving unicast services and at least the MB bandwidth size, and wherein the means for determining the MB bandwidth size determines, from the configuration one of the second set of configurable bandwidth sizes.

In Aspect 69, the apparatus of Aspect 68 includes wherein the second set of configurable bandwidth sizes defined for receiving unicast or MB services includes one or more additional MB bandwidth sizes.

In Aspect 70, the apparatus of any of Aspects 68 or 69 includes wherein the second set of configurable bandwidth sizes defined for receiving unicast or MB services includes an indicator of an information element within the MIB that indicates the MB bandwidth size and one or more additional MB bandwidth sizes.

In Aspect 71, the apparatus of any of Aspects 67 to 70 includes wherein the configuration includes a MIB that indicates one bandwidth size of the first set of multiple configurable bandwidth sizes for receiving unicast services, and wherein the means for determining the MB bandwidth size substitutes the MB bandwidth size for the one bandwidth size of the first set of multiple configurable bandwidth sizes based on a frequency range associated with a cell in which the apparatus is located.

In Aspect 72, the apparatus of any of Aspects 67 to 71 includes wherein the configuration includes a MIB that indicates one bandwidth size of the first set of multiple configurable bandwidth sizes for receiving unicast services and that indicates a SIB, wherein the apparatus further includes means for receiving the SIB, and wherein the means for determining the MB bandwidth size determines the MB bandwidth size further based on one or more information elements in the SIB that indicate the MB bandwidth size as being different than the one bandwidth size.

In Aspect 73, the apparatus of Aspect 72 includes wherein the MB bandwidth size is larger than the one bandwidth size of the first set of multiple configurable bandwidth sizes for receiving unicast services.

In Aspect 74, the apparatus of any of Aspects 72 or 73 includes wherein the SIB configures a MBSFN area for the MB service.

In Aspect 75, the apparatus of any of Aspects 72 to 74 includes means for decoding the SIB based on the one bandwidth size of the first set of multiple configurable bandwidth sizes for receiving unicast services, and means for decoding a subsequent SIB based on the MB bandwidth size.

In Aspect 76, the apparatus of Aspect 72 includes wherein the MB bandwidth size is smaller than the one bandwidth size of the first set of multiple configurable bandwidth sizes for receiving unicast services, and wherein the apparatus further includes means for decoding the SIB, one or more previous SIBs, or a downlink control channel based on the one bandwidth size of the set of multiple configurable bandwidth sizes for receiving unicast services.

In Aspect 77, the apparatus of any of Aspects 67 to 76 includes wherein the configuration includes a MIB that indicates one bandwidth size of the first set of multiple configurable bandwidth sizes for receiving unicast services, wherein the apparatus further includes means for receiving, in a control channel, a broadcast channel information list, and wherein the means determining the MB bandwidth size determines the MB bandwidth size based on the broadcast channel information list.

In Aspect 78, the apparatus of Aspect 77 includes means for decoding the control channel based on the one bandwidth size of the first set of multiple configurable bandwidth sizes for receiving unicast services, and means for decoding a subsequent control channel based on the MB bandwidth size.

In Aspect 79, the apparatus of any of Aspects 67 to 78 includes wherein the means for receiving the MB service over the MB bandwidth receives the MB service via multiple CCs, each of the multiple CCs having a bandwidth size of the first set of multiple configurable bandwidth sizes that is smaller than the MB bandwidth size.

In Aspect 80, the apparatus of Aspect 79 includes means for receiving, over a control channel for the MB service, an indication to receive the MB service over the multiple CCs.

In Aspect 81, the apparatus of any of Aspects 79 or 80 includes means for determining, based on a SIB indicating a MBSFN area for the MB service, to receive the MB service over the multiple CCs.

In Aspect 82, the apparatus of any of Aspects 67 to 81 includes means for determining one bandwidth size of the first set of multiple configurable bandwidth sizes for receiving unicast services that is a smallest bandwidth size of the first set that is larger than the MB bandwidth, and means for reporting, to a cell, the one bandwidth size that is the smallest bandwidth size of the first set that is larger than the MB bandwidth size, wherein receiving the MB service is based on the reporting.

In Aspect 83, the apparatus of any of Aspects 67 to 82 includes means for reporting, to a cell, an indication of the MB bandwidth size, wherein the means for receiving the MB service receives the MB service based on reporting the indication of the MB bandwidth size to the cell.

Aspect 84 is an apparatus for wireless communication including means for transmitting, in a cell, a configuration for a first set of multiple configurable bandwidth sizes for receiving unicast services, means for determining a MB bandwidth size for transmitting an MB service, the MB bandwidth size being different than each bandwidth size in the set of multiple configurable bandwidth sizes for receiving unicast services, means for transmitting an indication of the MB bandwidth, and means for transmitting, in the cell, the MB service over an MB bandwidth of the MB bandwidth size.

In Aspect 85, the apparatus of Aspect 84 includes wherein the configuration includes a MIB that indicates a second set of configurable bandwidth sizes defined for receiving unicast or MB services, wherein the second set of configurable bandwidth sizes defined for receiving unicast or MB services includes the first set of multiple configurable bandwidth sizes for receiving unicast services and at least the MB bandwidth size, and wherein the means for transmitting the indication of the MB bandwidth size indicates the MB bandwidth size in the configuration.

In Aspect 86, the apparatus of Aspect 85 includes wherein the second set of configurable bandwidth sizes defined for receiving unicast or MB services includes one or more additional MB bandwidth sizes.

In Aspect 87, the apparatus of any of Aspects 85 or 86 includes wherein the second set of configurable bandwidth sizes defined for receiving unicast or MB services includes an indicator of an information element within the MIB that indicates the MB bandwidth size and one or more additional MB bandwidth sizes.

In Aspect 88, the apparatus of any of Aspects 84 to 87 includes wherein the configuration includes a MIB that indicates one bandwidth size of the first set of multiple configurable bandwidth sizes for receiving unicast services, and wherein the means for transmitting the indication of the MB bandwidth size substitutes the MB bandwidth size for the one bandwidth size of the first set of multiple configurable bandwidth sizes based on a frequency range associated with the cell.

In Aspect 89, the apparatus of any of Aspects 84 to 88 includes wherein the configuration includes a MIB that indicates one bandwidth size of the first set of multiple configurable bandwidth sizes for receiving unicast services and that indicates a SIB, wherein the means for transmitting the indication includes means for transmitting the SIB, and indicating the MB bandwidth size as being different than the one bandwidth size in one or more information elements in the SIB.

In Aspect 90, the apparatus of Aspect 89 includes wherein the MB bandwidth size is larger than the one bandwidth size of the first set of multiple configurable bandwidth sizes for receiving unicast services.

In Aspect 91, the apparatus of any of Aspects 89 or 90 includes wherein the SIB configures a MBSFN area for the MB service.

In Aspect 92, the apparatus of and of Aspects 89 to 91 includes wherein the means for transmitting the SIB transmit the SIB based on the one bandwidth size of the first set of multiple configurable bandwidth sizes for receiving unicast services, and wherein the means for transmitting the SIB transmits a subsequent SIB based on the MB bandwidth size.

In Aspect 93, the apparatus of Aspect 89 includes wherein the MB bandwidth size is smaller than the one bandwidth size of the first set of multiple configurable bandwidth sizes for receiving unicast services, and wherein the means for transmitting the SIB transmits the SIB, one or more previous SIBs, or a downlink control channel based on the one bandwidth size of the set of multiple configurable bandwidth sizes for receiving unicast services.

In Aspect 94, the apparatus of any of Aspects 84 to 93 includes wherein the configuration includes a MIB that indicates one bandwidth size of the first set of multiple configurable bandwidth sizes for receiving unicast services, wherein the means for transmitting the indicator transmits, in a control channel, a broadcast channel information list that includes the MB bandwidth size.

In Aspect 95, the apparatus of Aspect 94 includes means for transmitting the control channel based on the one bandwidth size of the first set of multiple configurable bandwidth sizes for receiving unicast services, and means for transmitting a subsequent control channel based on the MB bandwidth size.

In Aspect 96, the apparatus of any of Aspects 84 to 95 includes wherein the means for transmitting the MB service transmits the MB service via multiple CCs, each of the multiple CCs having a bandwidth size of the first set of multiple configurable bandwidth sizes that is smaller than the MB bandwidth size.

In Aspect 97, the apparatus of Aspect 96 includes wherein the means for transmitting the indication transmits, over a control channel for the MB service, the indication to receive the MB service over the multiple CCs.

In Aspect 98, the apparatus of any of Aspects 96 or 97 includes wherein the means for transmitting the indication indicates, in a SIB for a MBSFN area for the MB service, to receive the MB service over the multiple CCs.

In Aspect 99, the apparatus of any of Aspects 84 to 98 includes means for receiving, from a UE, an indication of the MB bandwidth size, wherein means for transmitting the MB service transmits the MB service based on the indication of the MB bandwidth size.

Aspect 100 is a computer-readable medium including code executable by one or more processors to perform the operations of one or more methods in any of Aspects 1 to 33.

The specific order or hierarchy of blocks in the processes/flowcharts disclosed is an illustration of example approaches. Based upon design preferences, the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person of ordinary skill in the art to practice the various aspects described herein. Various modifications to these aspects will be readily apparent to those of ordinary skill in the art, and the generic principles defined herein may be applied to other aspects. The claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication, comprising:
    receiving, by a user equipment (UE), a configuration for a first set of multiple configurable bandwidth sizes for receiving unicast services, wherein the configuration includes a master information block (MIB) that indicates one bandwidth size of the first set of multiple configurable bandwidth sizes for receiving unicast services and that indicates a system information block (SIB), wherein the SIB indicates, for each of multiple multicast-broadcast single-frequency network (MBSFN) areas, a respective multicast broadcast (MB) bandwidth size for receiving an MB service, each of the respective MB bandwidth sizes for the multiple MBSFN areas being different than each bandwidth size in the first set of multiple configurable bandwidth sizes for receiving unicast services; and
    receiving the MB service over an MB bandwidth of the respective MB bandwidth size for one of the multiple MBSFN areas.

2. The method of claim 1, wherein the SIB configures the multiple MBSFN areas for the MB service.

3. The method of claim 1, wherein the SIB indicates, for each of the multiple MBSFN area, the respective MB bandwidth size as one of a second set of configurable bandwidth sizes defined for receiving MB services.

4. The method of claim 3, wherein the second set of configurable bandwidth sizes defined for receiving MB services includes one or more additional MB bandwidth sizes.

5. The method of claim 3, wherein the second set of configurable bandwidth sizes defined for receiving MB services includes an indicator of an information element within the SIB that indicates the respective MB bandwidth size for the one of the multiple MBSFN areas and one or more additional MB bandwidth sizes.

6. The method of claim 1, wherein receiving the MB service over the MB bandwidth for the one of the multiple MBSFN areas includes receiving the MB service via multiple component carriers (CCs), each of the multiple CCs having a respective bandwidth size of the first set of multiple configurable bandwidth sizes that is smaller than the respective MB bandwidth size for the one of the multiple MBSFN areas.

7. The method of claim 6, further comprising:
    receiving, over a control channel for the MB service, an indication to receive the MB service over the multiple CCs; and
    determining, based on the SIB, to receive the MB service over the multiple CCs.

8. The method of claim 1, further comprising reporting, to a cell, an indication of the respective MB bandwidth size for the one of the multiple MBSFN areas, wherein receiving the MB service is based on reporting the indication of the respective MB bandwidth size.

9. A method of wireless communication, comprising:
    transmitting, in a cell, a configuration for a first set of multiple configurable bandwidth sizes for receiving unicast services, wherein the configuration includes a master information block (MIB) that indicates one bandwidth size of the first set of multiple configurable bandwidth sizes for receiving unicast services and that indicates a system information block (SIB), wherein the SIB indicates, for each of multiple multicast-broadcast single-frequency network (MBSFN) areas, a respective multicast broadcast (MB) bandwidth size for receiving an MB service, each of the respective MB bandwidth sizes for the multiple MB SFN areas being different than each bandwidth size in the first set of multiple configurable bandwidth sizes for receiving unicast services; and
    transmitting, in the cell, the MB service over an MB bandwidth of the respective MB bandwidth size for one of the multiple MB SFN areas.

10. The method of claim 9, wherein the SIB configures the MBSFN areas for the MB service.

11. The method of claim 9, wherein the SIB indicates, for each of the multiple MBSFN areas, the respective MB bandwidth size as one of a second set of configurable bandwidth sizes defined for receiving MB services.

12. The method of claim 11, wherein the second set of configurable bandwidth sizes defined for receiving MB services includes one or more additional MB bandwidth sizes.

13. The method of claim 11, wherein the second set of configurable bandwidth sizes defined for receiving MB services includes an indicator of an information element within the SIB that indicates the MB bandwidth size for the one of the multiple MB SFN areas and one or more additional MB bandwidth sizes.

14. The method of claim 9, wherein transmitting the MB service includes transmitting the MB service via multiple component carriers (CCs), each of the multiple CCs having a respective bandwidth size of the first set of multiple configurable bandwidth sizes that is smaller than the respective MB bandwidth size for the one of the multiple MB SFN areas.

15. The method of claim 14, further comprising transmitting, over a control channel for the MB service, an indication to receive the MB service over the multiple CCs, and indicating, in the SIB, to receive the MB service over the multiple CCs.

16. The method of claim 9, further comprising receiving, from a user equipment (UE), an indication of the respective MB bandwidth size for the one of the multiple MBSFN areas, wherein transmitting the MB service is based on the indication of the respective MB bandwidth size.

17. An apparatus for wireless communication, comprising:
    a transceiver;
    a memory configured to store instructions; and
    one or more processors communicatively coupled with the memory and the transceiver, wherein the one or more processors are configured to:

receive a configuration for a first set of multiple configurable bandwidth sizes for receiving unicast services, wherein the configuration includes a master information block (MIB) that indicates one bandwidth size of the first set of multiple configurable bandwidth sizes for receiving unicast services and that indicates a system information block (SIB), wherein the SIB indicates, for each of multiple multicast-broadcast single-frequency network (MBSFN) areas, a respective multicast broadcast (MB) bandwidth size for receiving an MB service, each of the respective MB bandwidth sizes for the multiple MBSFN areas being different than each bandwidth size in the first set of multiple configurable bandwidth sizes for receiving unicast services; and receive the MB service over an MB bandwidth of the respective MB bandwidth size for one of the multiple MB SFN areas.

18. The apparatus of claim 17, wherein the SIB configures the multiple MB SFN areas for the MB service.

19. The apparatus of claim 17, wherein the SIB indicates, for each of the multiple MBSFN areas, the respective MB bandwidth size as one of a second set of configurable bandwidth sizes defined for receiving MB services.

20. The apparatus of claim 17, wherein the one or more processors are configured to receive the MB service over the MB bandwidth for the one of the multiple MB SFN areas at least in part by receiving the MB service via multiple component carriers (CCs), each of the multiple CCs having a respective bandwidth size of the first set of multiple configurable bandwidth sizes that is smaller than the respective MB bandwidth size for the one of the multiple MB SFN areas.

21. An apparatus for wireless communication, comprising:
a transceiver;
a memory configured to store instructions; and
one or more processors communicatively coupled with the memory and the transceiver, wherein the one or more processors are configured to:
transmit, in a cell, a configuration for a first set of multiple configurable bandwidth sizes for receiving unicast services, wherein the configuration includes a master information block (MIB) that indicates one bandwidth size of the first set of multiple configurable bandwidth sizes for receiving unicast services and that indicates a system information block (SIB), wherein the SIB indicates, for each of multiple multicast-broadcast single-frequency network (MBSFN) areas, a respective multicast broadcast (MB) bandwidth size for receiving an MB service, each of the respective MB bandwidth sizes for the multiple MBSFN areas being different than each bandwidth size in the first set of multiple configurable bandwidth sizes for receiving unicast services; and transmit, in the cell, the MB service over an MB bandwidth of the respective MB bandwidth size for one of the multiple MB SFN areas.

22. The apparatus of claim 19, wherein the second set of configurable bandwidth sizes defined for receiving MB services includes one or more additional MB bandwidth sizes.

23. The apparatus of claim 19, wherein the second set of configurable bandwidth sizes defined for receiving MB services includes an indicator of an information element within the SIB that indicates the MB bandwidth size and one or more additional MB bandwidth sizes.

24. The apparatus of claim 20, wherein the one or more processors are further configured to:
receive, over a control channel for the MB service, an indication to receive the MB service over the multiple CCs; and
determine, based on the SIB, to receive the MB service over the multiple CCs.

25. The apparatus of claim 17, wherein the one or more processors are further configured to receive the MB service based on reporting an indication of the respective MB bandwidth size for the one of the multiple MBSFN areas.

26. The apparatus of claim 21, wherein the SIB configures the multiple MBSFN areas for the MB service.

27. The apparatus of claim 21, wherein the SIB indicates, for each of the multiple MB SFN areas, the respective MB bandwidth size as one of a second set of configurable bandwidth sizes defined for receiving MB services.

28. The apparatus of claim 21, wherein the one or more processors are configured to transmit the MB service via multiple component carriers (CCs), each of the multiple CCs having a respective bandwidth size of the first set of multiple configurable bandwidth sizes that is smaller than the respective MB bandwidth size for the one of the multiple MB SFN areas.

29. The apparatus of claim 28, wherein the one or more processors are configured to transmit, over a control channel for the MB service, an indication to receive the MB service over the multiple CCs, and indicate, in the SIB, to receive the MB service over the multiple CCs.

30. The apparatus of claim 21, wherein the one or more processors are configured to receive, from a user equipment (UE), an indication of the respective MB bandwidth size for the one of the multiple MB SFN areas, wherein the one or more processors are configured to transmit the MB service based on the indication of the respective MB bandwidth size.

* * * * *